(12) United States Patent
Wagner

(10) Patent No.: US 12,670,523 B2
(45) Date of Patent: *Jun. 30, 2026

(54) INITIATING REQUESTS IN RESPONSE TO TRIGGERS ON CLIENT

(71) Applicant: REZOLVE Ai PLC, London (GB)

(72) Inventor: Daniel Maurice Wagner, London (GB)

(73) Assignee: REZOLVE AI PLC (GB)

( * ) Notice: Subject to any disclaimer, the term of this patent is extended or adjusted under 35 U.S.C. 154(b) by 9 days.

This patent is subject to a terminal disclaimer.

(21) Appl. No.: 19/019,745

(22) Filed: Jan. 14, 2025

(65) Prior Publication Data

US 2025/0156934 A1 May 15, 2025

Related U.S. Application Data

(63) Continuation of application No. 18/671,532, filed on May 22, 2024, now Pat. No. 12,229,821, which is a (Continued)

(51) Int. Cl.
*G06Q 30/00* (2023.01)
*G06Q 20/12* (2012.01)
*G06Q 30/0601* (2023.01)

(52) U.S. Cl.
CPC ......... *G06Q 30/0641* (2013.01); *G06Q 20/12* (2013.01)

(58) Field of Classification Search
CPC .................................................. G06Q 30/0641
See application file for complete search history.

(56) References Cited

U.S. PATENT DOCUMENTS 8,620,772 B2 12/2013 Owen
2005/0011958 A1 1/2005 Fukasawa et al.
(Continued)

FOREIGN PATENT DOCUMENTS

CN 105913101 A 8/2016
CN 107220825 A 9/2017
(Continued)

OTHER PUBLICATIONS

Mayrhofer, Mira, et al. "User generated content presenting brands on social media increases young adults' purchase intention." International Journal of Advertising 39.1 (2020): 166-186.*

(Continued)

*Primary Examiner* — Kathleen Palavecino
(74) *Attorney, Agent, or Firm* — FOLEY & LARDNER LLC

(57) ABSTRACT

Provided herein are methods whereby item provider services can define unique offerings, including categories of products, individual products, and information requests, and link them to a trigger, enabling the item provider service promote the offerings to the end users. A trigger can include any unique and specially formatted media entity that, in conjunction with software on a mobile device, can be detected using sensors to initiate a workflow. Triggers may include, for example, specially formatted images, videos, audio signals, QR codes, GPS locations, Bluetooth beacons, or similar mobile-detectable entities, among others. Triggers may be defined and associated with an offering.

20 Claims, 33 Drawing Sheets

Related U.S. Application Data continuation of application No. 17/606,349, filed as application No. PCT/IB2020/053950 on Apr. 27, 2020, now Pat. No. 12,026,768.

(60) Provisional application No. 62/850,424, filed on May 20, 2019.

(56) References Cited

U.S. PATENT DOCUMENTS

| | | |
|---|---|---|
| 2011/0219025 A1 | 9/2011 | Lipson et al. |
| 2014/0257991 A1 | 9/2014 | Christensen et al. |
| 2014/0278998 A1 | 9/2014 | Systrom et al. |
| 2014/0337175 A1 | 11/2014 | Katzin et al. |
| 2016/0092926 A1 | 3/2016 | Herberger et al. |
| 2016/0283595 A1 | 9/2016 | Folkens et al. |
| 2017/0011134 A1 | 1/2017 | Rhoads et al. |
| 2019/0026723 A1 | 1/2019 | Narasimhan et al. |
| 2019/0385218 A1 | 12/2019 | Kennewick |

FOREIGN PATENT DOCUMENTS

| | | |
|---|---|---|
| EP | 1 054 335 A2 | 11/2000 |
| JP | 2006-309791 A | 11/2006 |
| JP | 2011-529609 A | 12/2011 |
| JP | 2019-021286 | 2/2019 |
| WO | WO-2016/044290 A1 | 3/2016 |
| WO | WO-2018/046071 A1 | 3/2018 |

OTHER PUBLICATIONS

Chinese Office Action on Appl No. 10-2021-7040664 dated Jan. 9, 2025.

Foreign Action on JP Application No. 2021-568711 dated Jun. 28, 2024.

Foreign Action other than Search Report on European Application No. 20723547.4 dated Jun. 24, 2024.

International Preliminary Report on Patentability on PCT PCT/IB2020/053950 dated Dec. 2, 2021.

International Search Report and Written Opinion on PCT PCT/IB2020/053950 dated Jul. 17, 2020 (14 pages).

Japanese Office Action Application No. 2021-568711 dated Dec. 21, 2023.

Non-Final Office Action on U.S. Appl. No. 17/606,349 DTD Dec. 5, 2023.

Notice of Allowance on U.S. Appl. No. 17/606,349 DTD May 13, 2024.

Notice of Allowance on U.S. Appl. No. 18/671,532 DTD Jan. 2, 2025.

"Combining RFID, NFC and QRCodes with django-oscar online shop." RkBlog, Aug. 5, 2013, https://rkblog.dev.

Canadian Examiner's Report on CA Appl. No. 08949800 dated Apr. 4, 2025.

Canadian Office Action on CA Appl. No 3,135,216 dated Feb. 20, 2026.

Chinese Office Action on CN Appl. No. 2020800372328 dated May 1, 2025, with machine translation.

Chinese Office Action on CN Application No. 202080037232.8 dated Feb. 15, 2026, with English translation.

Mexican Office Action on MX Appl. No. MX/a/2021/014023 dated Nov. 21, 2025.

\* cited by examiner

FIG. 25

Cart Detail Screen

Cart Selection Screen

FIG. 38

ACT content returned from RCE:

- ACT image(s)
- ACT name
- ACT short description
- ACT long description
- Product custom options

- ACT summary screen denoting the ACT was submitted
- Link to your ACT history to see the status of the ACT

- ACT detail summary

- Detailed map of where the order was placed from (based on device location)

- Merchant specific contact details

INITIATING REQUESTS IN RESPONSE TO TRIGGERS ON CLIENT

CROSS-REFERENCES TO RELATED APPLICATIONS

The present application is a continuation of U.S. patent application Ser. No. 18/671,532, filed on May 22, 2024, which is a continuation of U.S. patent application Ser. No. 17/,606,349, filed on Oct. 25, 2021 which is a U.S. National Stage Application under 35 U.S.C. § 371 of International Patent Application No. PCT/IB2020/053950, filed on Apr. 27, 2020, which claims priority under PCT Article 8 to U.S. Provisional Application No. 62/850,424, titled "INITIATING REQUESTS IN RESPONSE TO TRIGGERS ON CLIENT," filed May 20, 2019, which is incorporated herein by reference in its entirety.

BACKGROUND

In a networked environment, computing devices can communicate data to one another. Upon receipt, the recipient computing device can process the data and provide a response over the networked environment to other computing devices.

SUMMARY

In one aspect, the present disclosure is directed to a system to initiate requests in response to triggers. The system can include an application executable on a client device having one or more processors. The application can acquire data via a sensor communicatively coupled with the client device. The application can determine that the data acquired via the sensor matches one of a plurality of trigger conditions for initiating transactions defined by a corresponding item provider service. The application can transmit a request to initiate transaction to a data processing system. The request can include at least a portion of the data acquired via the sensor. Receipt of the request to initiate can cause the data processing system to identify an item associated with one of the item provider services and corresponding to the portion of the data to provide to the client device. The application can receive an indication identifying the item associated with one of the item provider services from the data processing system. The application can present, responsive to receiving the indication, a user interface including an element for selecting the item. The application can detect an interaction with the element of the user interface for selecting the item via the client device. The application can transmit, responsive to detecting the interaction, a request to proceed with the transaction on the item identified by the data processing system. The request can identify the interaction. Receipt of the request to proceed can cause the data processing system to generate a result based on the interaction of the request to provide to the client device. The application can receive the result from the data processing system for presentation on the user interface.

In another aspect, the present disclosure is directed to a system to handle requests in response to triggers. The system can include a data processing system having one or more processors. The data processing system can receive, from a client device, a request to initiate transaction. The request to initiate can include at least a portion of data acquired via a sensor communicatively coupled with the client device and determined as matching one of a plurality of trigger conditions for initiating transactions defined by a corresponding item provider service. The data processing system can identify, based on the portion of the data included in the request to initiate received from the client, an item associated with one of the item provider services. The data processing system can transmit, to the client device, an indication identifying the item associated with one of the item provider services and corresponding to the portion of the data, the indication causing the client device to present a user interface. The user interface can include an element for selecting the item. The data processing system can receive, from the client device responsive to detecting an interaction with the element of the user interface, a request to proceed with the transaction on the item. The request to proceed can identify the interaction corresponding to the item. The data processing system can process the request to proceed received from the client device to generate a result indicating an outcome of the transaction based on the interaction corresponding to the item. The data processing system can transmit, to the client device, the result causing the client device to present the result on the user interface.

In another aspect, the present disclosure is directed to a method of initiating requests in response to triggers. An application executing on a client device having one or more processors can acquire data via a sensor communicatively coupled with the client device. The application can determine that the data acquired via the sensor matches one of a plurality of trigger conditions for initiating transactions defined by a corresponding item provider service. The application can transmit a request to initiate transaction to a data processing system. The request can include at least a portion of the data acquired via the sensor. Receipt of the request to initiate can cause the data processing system to identify an item associated with one of the item provider services and corresponding to the portion of the data to provide to the client device. The application can receive an indication identifying the item associated with one of the item provider services from the data processing system. The application can present, responsive to receiving the indication, a user interface including an element for selecting the item. The application can detect an interaction with the element of the user interface for selecting the item via the client device. The application can transmit, responsive to detecting the interaction, a request to proceed with the transaction on the item identified by the data processing system. The request can identify the interaction. Receipt of the request to proceed can cause the data processing system to generate a result based on the interaction of the request to provide to the client device. The application can receive the result from the data processing system for presentation on the user interface.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIGS. 22-27 depict screenshots of an example user interface for an item provider service process for creating actions;

FIGS. 33-38 depicts screenshots of an example user interface for an application on a client device for specifying delivery parameters;

DETAILED DESCRIPTION

Following below are more detailed descriptions of various concepts related to, and implementations of, methods, apparatuses, and systems of initiating requests in response to triggers. The various concepts introduced above and discussed in greater detail below may be implemented in any of numerous ways.

Provided herein are methods whereby item provider services can define unique offerings, including categories of products, individual products, and information requests, and link them to a trigger, enabling the item provider service to promote the offerings to the end users. A trigger can include any unique and specially formatted media entity that, in conjunction with software on a mobile device (e.g., an Android® or Apple IOS® smart phone), can be detected using sensors to initiate a workflow. Triggers may include, for example, specially formatted images, videos, audio signals, quick response (QR) codes, global positioning system (GPS) locations, Bluetooth beacons, or similar mobile-detectable entities, among others. Triggers may be defined and associated with an offering.

When an end user uses a smartphone application to interact with a trigger, the resulting interactions may be governed by end user process. The process to be executed can vary depending upon the type of offering associated with the trigger. For example, if the offering includes a product, the end user can engage with a purchase process. On the other hand, if the offering is an information solicitation, the end user can engage with the act process. The methods of the item provider service process and end user process, and the system they run upon, are the subject of this patent. The item provider service process and end user process can include server-side software code and user interfaces, and mobile software code and user interfaces, and their particular arrangement on the supporting system into a cohesive whole. The system can be multiple components, including backend code, an item provider service user interface, an embeddable software development kit (SDK) for the client device, and various adapters to external services, such as payment gateways.

Figure 1:
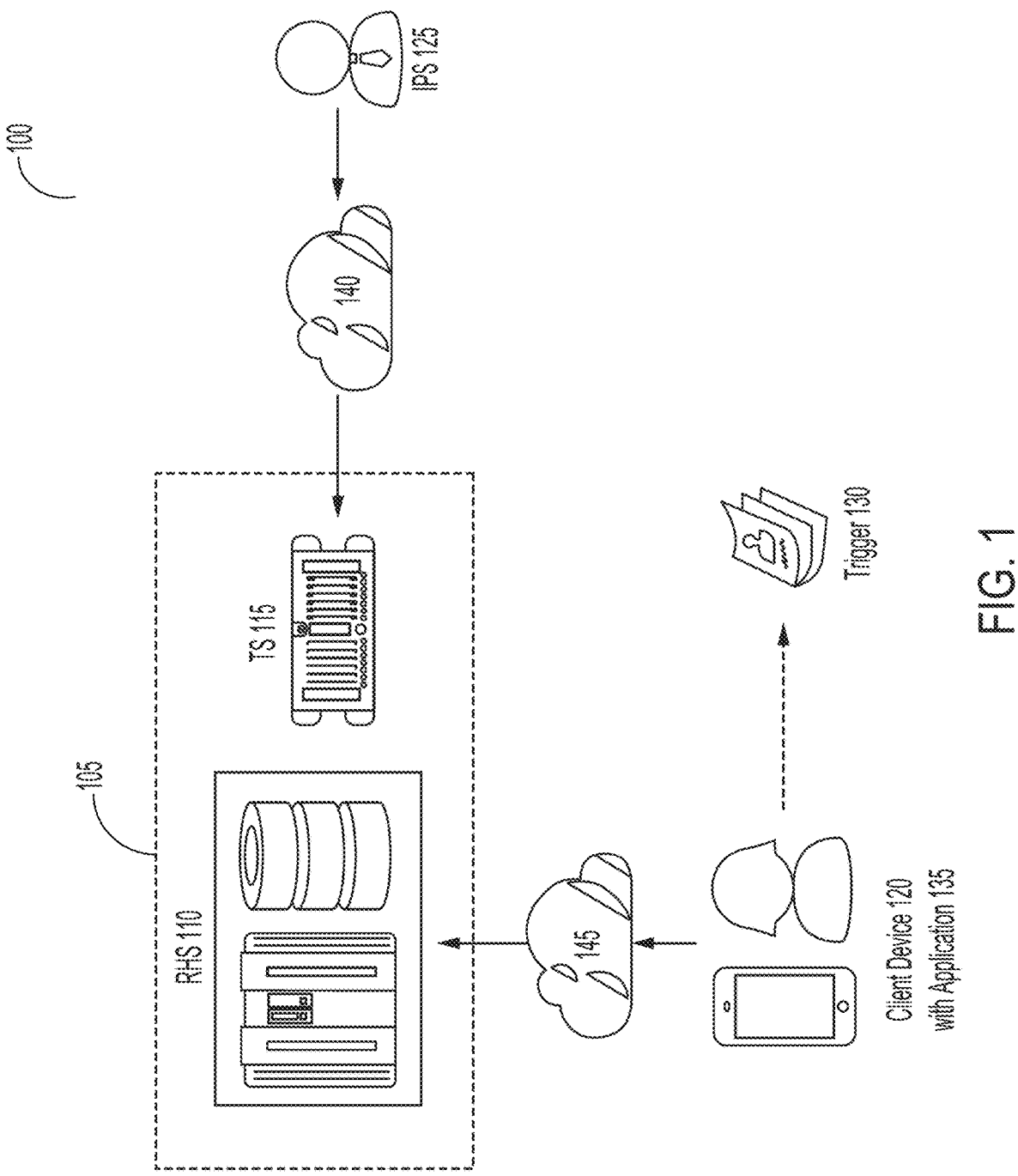
FIG. 1 depicts a block diagram of an example system for indexing triggers for items and initiating requests in response to triggers.

FIG. 1, among others, depicts a block diagram of an example system 100 for indexing triggers for items and initiating requests in response to triggers. The system 100 can include at least one data processing system (DPS) 105. The data processing system 105 can include at least one request handler server (RHS) 110 to process communications. The data processing system 105 can include at least one transaction service (TS) 115 to execute transaction processes. The system 100 can include at least one client device 120. The client device 120 can include or execute at least one application 135 to handle at least one trigger 130. The system 100 can include at least one item provider service (IPS) 125 to configure the transaction processes. The system 100 can include at least one network 145 to communicatively couple the client device 120 with the data processing system 105. The system 100 can include at least one network 140 to communicative couple the item provider service 125 with the data processing system 105.

Figure 44:
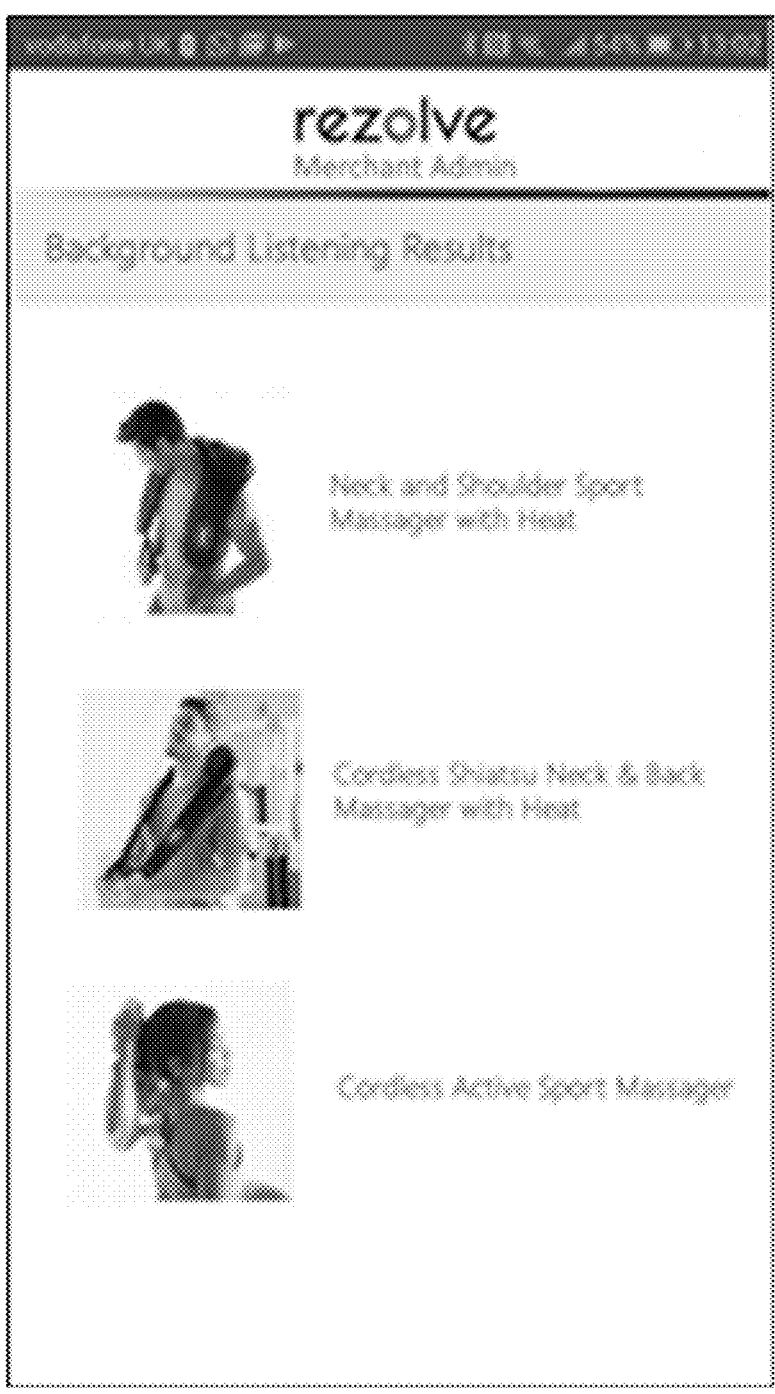
FIG. 44 depicts screenshots of an example user interface for an application on a client device for background listening.
Figure 45:
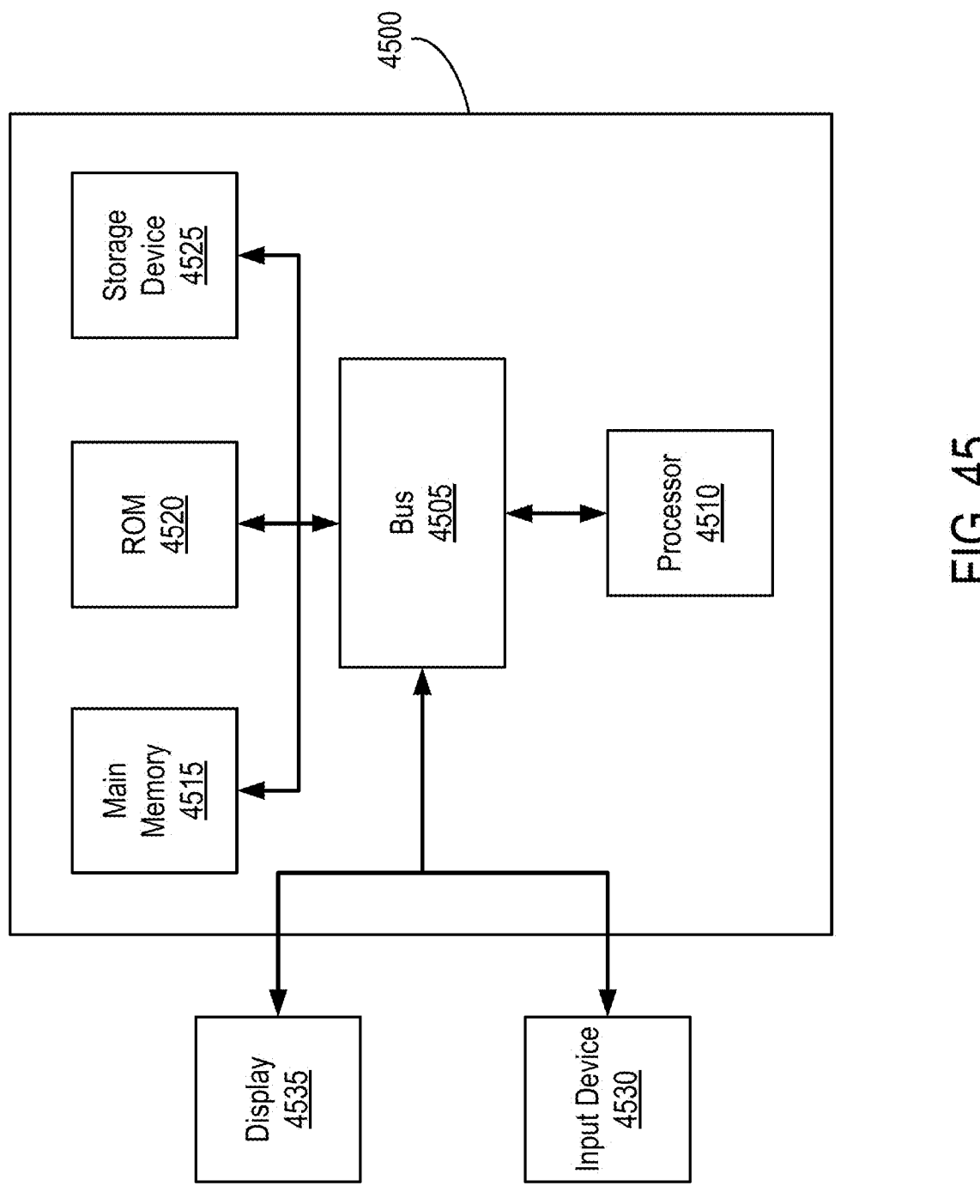
FIG. 45 depicts a block diagram illustrating an architecture for a computer system that can be employed to implement elements of the systems and methods described and illustrated herein.

Each of the components or modules of the system 100 (such as the data processing system 105 including the request handler server 110 and the transaction service 115, the client device 120, and the item provider service 125) can be implemented using hardware or a combination of software and hardware such as those detailed herein in conjunction with FIG. 45. Each component can include logical circuity (e.g., a central processing unit) that responses to and processes instructions fetched from a memory unit. Each electronic component can be based on any of these processors, or any other processor capable of operating as described herein. The central processing unit can utilize instruction level parallelism, thread level parallelism, different levels of cache, and multi-core processors. A multi-core processor can include two or more processing units on a single computing component. In addition, each of the components or modules of the system 100 (such as the data processing system 105 including the request handler server 110 and the transaction service 115, the client device 120, and the item provider service 125) can display any of the interfaces described herein in conjunction with FIGS. 7-44.

The item provider service 125 can be operated or managed by an administrator (also referred herein as a merchant). The administrator can include, among others, an entity that provides services to, sells products to, or wishes to acquire information from end users. The item provider service 125 can provide or handle an offering of a product or a notification to the end users on client devices 120. The offering can correspond to a product, category of products, information form, or other resource that is described by the item provider service 125 and offered to end users so the end user may interact and obtain a resultant outcome. The product can correspond to any object that the item provider service 125 (or the administrator of the item provider service 125) is to offer. The product, for example, can include clothing, to food orders, theatre tickets, downloadable products, and services, among others. The products can be classified into a category corresponding to a hierarchy for arranging the product. The notification can include a service-defined solicitation for information, presented as a fillable form. The notification can be used to join contact lists, sign petitions, enter contests, request information, or join an organization, among many other uses. The item can include one or more of the product or the notification provided by the item provider service 125.

To configure the data processing system 105 to facilitate the transaction, the item provider service 125 can send a request for a form (sometimes herein referred to as an offering creation form) to add at least one item to the transaction service 115. The item provider service 125 can generate the request for the form. The request can include an identifier for the transaction service 115. The identifier (also referred herein as a lookup identifier) can include a set of alphanumerical characters referencing the data processing system 105 or the transaction service 115, such as a Uniform Resource Locator (URL) among others. The identifier may be used to direct the request for the form via the network 140 to the data processing system 105 or the transaction service 115 of the data processing system 105. At least one transaction service 115 for one or more of the item provider services 125 may be maintained by the data processing system 105. The transaction service 115 and the item provider 125 may be part of a single system or component. For example, the item provider service 125 may be the front end (e.g., a user interface (UI)) and the transaction service 115 may be the back end (e.g., logic and application programming interface (API)) of the same system associated with the same entity. Upon receipt of the request, the transaction service 115 can transmit a response including a form to the item provider service 125. The form can be a graphical user interface for presentation on the item provider service 125. The form can include one or more interface elements for adding an item for the offering to be provided via the data processing system 105.

The item provider service 125 can send a request to add an item to the transaction service 115. Using the form received from the transaction service 115, the administrator of the item provider service 125 can populate elements on the form. The administrator of the item provider service 125 can use the entries on the elements of the form to set parameters for the item. Using the entries on the form, the item provider service 125 can generate a request to add the item. The request can include an item specification including information regarding the product or notification provided by the item provider service 125. The item specification can include the one or more parameters as set by the item provider service 125 using the elements of the form. The request can include an identifier for the item provider service 125 and an identifier for the product or notification, among other information. For each identifier for the product or notification, the request can include a descriptor. The identifier for the product or notification and the descriptor can be part of the item specification. With the completion of the form, the administrator of the item provider service 125 can interact on an element on the form to send the request. In response to the interaction with the element, the item provider service 125 can generate the request using the entries on the form. Upon generation, the item provider service 125 can transmit the request over the network 140.

In turn, the transaction service 115 can receive the request from the item provider service 125. The transaction service 115 can parse the request to identify extract the identifier for the item provider service 125 and the identifier for the product or the notification. The transaction service 115 can parse the request to identify or extract the item specification including information regarding the product or notification, the identifier for the item, and the descriptor. The transaction service 115 can store the extracted identifier for the item provider service 125 onto a database accessible by the request handler server 110. The transaction service 115 can store the identifier for the product or notification onto the database. The identifier can be indexed onto the database. The transaction service 115 can store the item specification including the information regarding product or notification onto the database. Upon storage, the transaction service 115 can send a confirmation of receipt back to the item provider service 125.

In conjunction, the item provider service 125 can send a request for a form (sometimes referred herein as a trigger creation form) to add at least one trigger 130 for an item to the transaction service 115. The trigger 130 can include data acquired via a sensor, such as an image, audio file, video, a quick response (QR) code, Bluetooth beacon, global positioning system (GPS) location, among others, that can be detected by a sensor connected with the client device 120. The data can be acquired via the application 135 executing on the client device 120. The item provider service 125 can generate the request for the form. The request can include the identifier for the transaction service 115 or an identifier for the request handler server 110. The identifier can include a set of alphanumerical characters referencing the data processing system 105, the request handler server 110, or the transaction service 115 server 110 (e.g., a Uniform Resource Locator (URL)). The identifier may be used to direct the request for the form via the network 140 to the data processing system 105, the request handler server 110, or the transaction service 115. Upon receipt of the request, the transaction service 115 can transmit a response including a form to the item provider service 125. The form can be a graphical user interface for presentation on the item provider service 125. The form can include one or more interface elements for adding a trigger 130 to be provided via the data processing system 105.

The item provider service 125 can send a request to add the trigger 130 to the transaction service 115. Using the form received from the transaction service 115, the administrator of the item provider service 125 can populate elements on the form. The administrator of the item provider service 125 can use the entries on the elements of the form to set parameters for the trigger 130 for the item. For example, the administrator may upload an image of product to use as the trigger 130. Using the entries on the form, the item provider service 125 can generate a request to add the trigger 130. The request can include a trigger specification defining the data to be compared against for the trigger 130. The trigger specification can include the one or more parameters as set by the item provider service 125 using the elements of the form to define the trigger specification. The trigger specification can include the data themselves for the trigger 130 or can include parameters specifying the data for the trigger 130. The data can include an image, audio file, video, a quick response (QR) code, Bluetooth beacon, global positioning system (GPS) location, among others, to be detected by one of the sensors on the client device 120. The request can include an identifier for the trigger 130 (e.g., an alphanumeric character set or a URL for where the data is stored).

The data can be uploaded via the form provided from the transaction service 115. With the completion of the form, the administrator of the item provider service 125 can interact on an element on the form for sending the request. In response to the interaction with the element, the item provider service 125 can generate the request using the entries on the form. Upon generation, the item provider service 125 can transmit the request over the network 140.

The transaction service 115 (or the request handler server 110) can receive the request from the item provider service 125. The transaction service 115 can parse the request to extract the trigger specification defining the data for the trigger 130. The transaction service 115 can parse the request to extra the identifier for the data defining the trigger 130. The transaction service 115 can store the trigger specification defining the data for the trigger 130 from the item provider service 125 and the identifier for the trigger 130 onto the database accessible by the request handler server 110. The identifier can be used to index the data for the trigger 130 on the database. Upon storage, the transaction service 115 can send a confirmation of receipt back to the item provider service 125.

Additionally, the item provider service 125 can send a request to combine the item (also referred herein as an engagement request) the item with the trigger 130. The request to combine can be sent in conjunction with the request to add the trigger 130 from the item provider service 125. Using the form received from the transaction service 115, the administrator of the item provider service 125 can populate elements on the form in generating the request to combine. The item provider service 125 can use the entries on the elements of the form to populate and generate the request to combine. The request can include the identifier for the product or the notification along with the identifier for the data corresponding to the trigger 130. The request can include offering data associated with the product or the notification. The offering data can include a description of the product or the notification, such as price for the product or notification, name for the product or notification, and provider name among others. With the completion of the form, the administrator of the item provider service 125 can interact on an element on the form to send the request. In response to the interaction with the element, the item provider service 125 can generate the request using the entries on the form. Upon generation, the item provider service 125 can transmit the request to combine over the network 140.

The transaction service 115 can receive the request to combine from the item provider service 125. The transaction service 115 can parse the request to extract the identifier for the item (e.g., the product or notification) and the identifier for the trigger 130. The transaction service 115 can search for the identifier for the item and the identifier for the data for the trigger 130 stored on the database accessible by the request handler server 110. Upon finding the identifiers, the transaction service 115 can associate the identifier for the item with the identifier for the data for the trigger 130. In associating, the transaction service 115 can create or generate a path to define the association between the item and the data for the trigger. The information in the path can include, for example, the item identifier, a partner identifier, a merchant identifier, and a category identifier, among others. The information for the path may be embedded in the data for the trigger. A reference identifier may be also included in or indexed with the data for the trigger. Using the reference identifier, the association may be found from a database maintaining the associations. Upon association, the transaction service 115 can store the association of the identifier for the item with the identifier for the trigger 130 onto the database. The transaction service 115 can send a confirmation of receipt back to the item provider service 125. With the association of the identifier for the item with the identifier for the trigger, the transaction service 115 can send the data corresponding to the trigger 130 to the request handler server 110.

With receipt of the data for the trigger 130, the request handler server 110 can encode the data corresponding to the trigger 130. The request handler server 110 can also encode the data defined by the trigger specification for trigger 130. For example, if the trigger specification can include a message for a QR code, the request handler server 110 can generate the QR code using the message as the encoded data. In encoding, the request handler server 110 can identify the path information for the item to be provided by the item provider service 125, and associate the identifier for the item with the data for the trigger 130. The request handler server 110 can store the encoded data corresponding to the trigger 130 onto the database accessible to the request handler server 110. The request handler server 110 can generate at least one link for the encoded data for the trigger 130. The link can include at least a portion of the identifier for the data for the trigger 130. For example, the link can include a hostname referencing the request handler server 110 and a file pathname referencing the encoded data corresponding to the trigger 130. The request handler server 110 can send the link back to the transaction service 115.

Subsequently, the item provider service 125 can send a request for the encoded data corresponding to the trigger 130 to the transaction service 115. The request can include the identifier for the original data for the trigger 130. The item provider service 125 can send the request in response to receipt of the confirmation of storage. When received, the transaction service 115 can parse the request to identify the identifier for the trigger 130. Using the identifier, the transaction service 115 can search for the encoded data for the trigger 130 on the database. Upon finding the data corresponding to the trigger 130, the transaction service 115 can send a response with the link to the encoded data for the trigger 130 to the item provider service 125. The response can also include the encoded data for the trigger 130 itself.

In response to receipt of the response, the item provider service 125 can parse the response to identify the link. The item provider 125 can make available the link corresponding to the encoded data for the trigger 130 or the encoded data for the trigger 130 via the network 140 or 145. The item provider 125 can provide the link corresponding to the encoded data for the trigger 130 or the encoded data for the trigger 130 itself to the applications 135 running on the client devices 120. With the provision of the encoded data to applications 135 running on client devices 120 across the network 140 or 145, the configuration of the transaction service 115 and the request handler system 110 for the provision of the item can be complete.

The application 135 running on the client device 120 can receive one or more links to the encoded data for the trigger 130 via the network 140 or 145. The application 135 can be provided by the data processing system 105, and can be installed on the client device 120. The application 135 can be a standalone program or a plugin to another application running on the client device 120. The application 135 can be a background process executing on the client device 120. The application 135 can be configured with a software development kit (SDK). The SDK can be used to perform functionality including but not limited to maintaining a collection of payment accounts, providing a user interface for managing an end user's address and contact data, browsing a website of the item provider service 125, browsing the offerings of the item provider service 125, detecting triggers 130, surfacing the user interface, interacting with a process, securely submitting payment for products and services, and showing a history of past transactions, among others. The SDK can also be used by the application 135 to interface with the request handler server 110 and the transaction service 115 of the data processing system 105 to access and carry out various processes in relation to the items provided by the item provider service 125.

Upon receipt of the links, the application 135 can store and maintain the links on a storage of the client device 120 (e.g., memory or hard disk). The application 135 can also retrieve the encoded data referenced by the links from the request handler server 110. The application 135 can store and maintain the encoded data retrieved from the request handler server 110 onto the storage of the client device 120. The application 135 can be used by an end user of the client device 120 to initiate the transaction of the product or retrieval of the notification. The end user can include any individual that operates the application 135 and intends to purchase products or services from the item provider service 125 or provide the information to the item provider service 125.

The application 135 can monitor for data acquired via at least one sensor communicatively coupled with the client device 120. The sensors of the client device 120 can include a camera, a microphone, a global position system (GPS) device, a near field communication (NFC) unit, and a Bluetooth connector among others. The data can include an image, a QR code, or a video acquired via the camera, an audio file acquired via the microphone, a geographical location acquired via the GPS device, a radiofrequency identification acquired via the NFC unit, and a Bluetooth beacon signal acquired via the Bluetooth connector. The application 135 can initiate monitoring for the data in response to an interaction by the end user of the client device 120 with the application 135. The application 135 can initiate monitoring for the data in response to initializing of the execution of the application 135 on the client device 120. In initiating, the application 135 can invoke the sensor to start acquiring the data via the sensor. The application 135 can also execute as a background process on the client device 120. Executing as one of the background processes, the application 135 can continuously monitor for the data via the sensor.

Upon acquisition of the data from the sensor, the application 135 can compare the data with one of the encoded data for the triggers 130. The application 135 can use the links provided by the data processing system 105 to retrieve the encoded data to compare against. The application 135 can access the encoded data via the links provided by the data processing system 105. The encoded data may be stored and maintained by the database accessible via the request handler server 110. The application 135 can also access the encoded data using other types of data. For example, the application 135 can use the geographic location identified using the GPS unit to find the encoded data of the trigger. With retrieval of the encoded data, the application 135 can perform the comparison between the acquired data with one of the encoded data for the triggers 130. The application 135 can perform the comparison between the acquired data with one of the trigger specifications defining the trigger 130. From the comparison, the application 135 can determine that the data acquired from the sensor does not match with any of the encoded data for the triggers 130. In response to the determination, the application 135 can continue monitoring for data acquired via the sensors.

Conversely, from the comparison, the application 135 can determine that the data acquired from the sensor matches with one of the encoded data for the triggers 130. In response to determining that the data matches the trigger 130, the application 135 can generate a request for the item (also referred herein as an offering request) to the request handler server 110. The application 135 can identify the item corresponding to the data matching the encoded data for the trigger 130. The request can include the identifier for the item associated with the encoded data corresponding to the trigger 130. The identifier for the item can be used to direct the request to the request handler server 110 or the transaction service 115. The application 135 can include the identifier of the item (e.g., the product or the notification provided by the item provider service 125) into the request. With the generation, the application 135 can transmit the request for the item to the request handler server 110 or the transaction service 115.

The request handler server 110 can receive the request for the item from the application 135 executing on the client device 120. The request handler server 110 can parse the request to extract the identifier for the item. Using at least a portion of the identifier, the request handler server 110 can also identify one of the transaction services 115 of the data processing system 105 to handle the request for the item. The transaction service 115 identified using the identifier can be associated with the item provider service 125. The request handler server 110 can forward the request from the client device 120 to the transaction service 115 for further processing of the request.

Upon receipt of the request for the item from the client device 120 or from the request handler server 110, the transaction service 115 can parse the request to extract the identifier for the item. Using the identifier, the transaction service 115 can identify the offering data for the item corresponding to the identifier extracted from the request. The offering data can include a description of the product or the notification, such as price for the product or notification, name for the product or notification, and provider name among others. With the identification, the transaction service 115 can provide the offering data to the request handler server 110. The request handler server 110 in turn can forward or send a response including the offering data to the application 135 associated with the request for the item. The transaction service 115 can also directly transmit the offering data to the application 135 running on the client device 120.

The application 135 can receive the offering data from the request handler server 110 or from the transaction service 115. Using the offering data, the application 135 can generate and present a user interface for carrying out the purchase of the product or the notification. The user interface can include one or more elements to display information regarding the product or the notification provided by the item provider service 125. The user interface can also be pre-configured on the application 135. The application 135 can invoke another application on the client device 120 for the presentation of the user interface. For example, the application 135 can invoke a web browser using the offering data to fetch a webpage to enter information for carrying out the purchase of the product or the notification. The end user of the application 135 can interact with the elements of the user interface to fill in or set one or more parameters (e.g., delivery, billing, and provision of user data, among others) to carry out the transaction in relation to the item.

Using the selection of the items on the user interface, the application 135 can generate a request to proceed (also referred herein as a user submission) to the request handler server 110. The application 135 can use the inputs on the other program (e.g., web browser) to generate the request to proceed to send to the request handler server 110. The request to proceed can include the identifier for the item (e.g., the product or the notification). The request to proceed can include the parameters (e.g., delivery, billing, and provision of user data, among others) specified by the end user using the interface. The request to proceed can also include the identifier for the request handler server 110 to direct the request to the request handler server 110 over the network 140. The request to proceed can include the identifier for the transaction service 115 to direct the request to the transaction service 115 over the network 145.

Upon receipt of the request to proceed from the application 135, the request handler server 110 can parse the request to extract the identifier for the item and the one or more parameters. Using the identifier, the request handler server 110 can also identify one of the transaction services 115 of the data processing system 105 to handle the request. The transaction service 115 identified using the identifier can be associated with the item provider service 125. The request handler server 110 can forward the request from the client device 120 to the transaction service 115 for further processing of the request. The request handler server 110 can forward the one or more parameter to carry out the transaction to the transaction service 115 for further processing.

The transaction service 115 can process the transaction indicated by the request received from the request handler server 110 or the transaction service 125. The transaction service 115 can parse the request to extract the identifier for the item and the one or more parameters. The transaction service 115 can execute the transaction for the item corresponding to the identifier in accordance with the one or more parameters. In processing the request, the transaction service 115 for the item service provider 125 can generate a resultant outcome. The resultant outcome can include an indication as to success or failure in carrying out the transaction. The resultant outcome can also include the one or more parameters (e.g., delivery, billing, and provision of user data, among others) from the request to proceed in carrying out the transaction. The transaction service 115 can provide the outcome to the request handler server 110.

The request handler server 110 (or the transaction service 115) can identify the application 135 on the client device 120 to which to send the outcome. The request handler server 110 in turn can send the outcome from the transaction service 115 to the client device 120. Upon receipt from the request handler server 110 (or the transaction service 115), the application 135 can present the resultant outcome on the user interface for the offering data. The application 135 can use the same user interface for entering the one or more parameter for carrying out the transaction to present the outcome. The application 135 can also present the resultant outcome on a different user interface.

Figure 2:
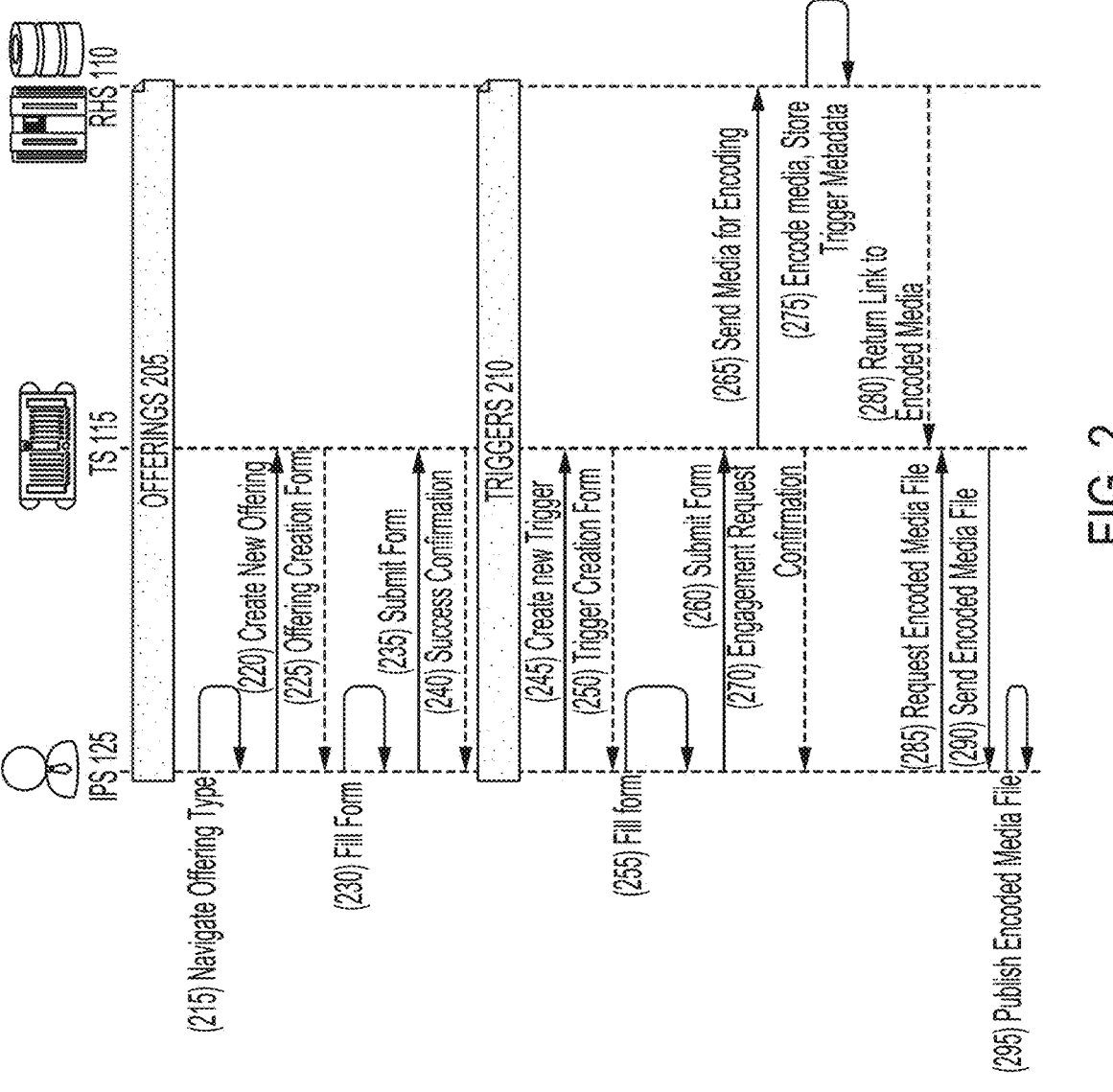
FIG. 2 depicts a function band diagram of an example process of indexing triggers for items.

FIG. 2, among others, depicts a function band diagram of an example process 200 of indexing triggers for items. In brief overview, the process 200 includes an offerings process 205 and a triggers process 210. An item provider service 125 enters the transaction service 115 UI and navigates to the type of offering they wish to create (210). The item provider service 125 selects "Create New" (220) and is presented with an offering creation form, specific to the offering type chosen (225). The item provider service 125 fills the form (230) and submits the form to the transaction service 115

(235). The transaction service 115 returns a success confirmation (240). Now the item provider service 125 is ready to link the offering to a trigger. The item provider service 125 navigates to "Engagements" and selects "Create new" (245), and is returned a form (250). The item provider service 125 chooses what type of trigger to create (image, audio, QR, etc.), uploads a media file if required, and selects which offering the trigger should link to (255). When the form is submitted (260), if supplied, the media file is sent to request handler server 110 for encoding, or else request handler server 110 may use internal resources to create encoded media (like in the case of QR codes) (265). The transaction service 115 confirms an engagement has been requested (270). Asynchronously, request handler server 110 creates the encoded media, stores the trigger metadata for later routing duties (275), and returns a link to the encoded file to the transaction service 115 (280). The item provider service 125 requests the encoded file (285) and the transaction service 115 returns it as a download (290). The item provider service 125 is then able to save the file, and use the file in publishing and advertising (295).

Figure 3:
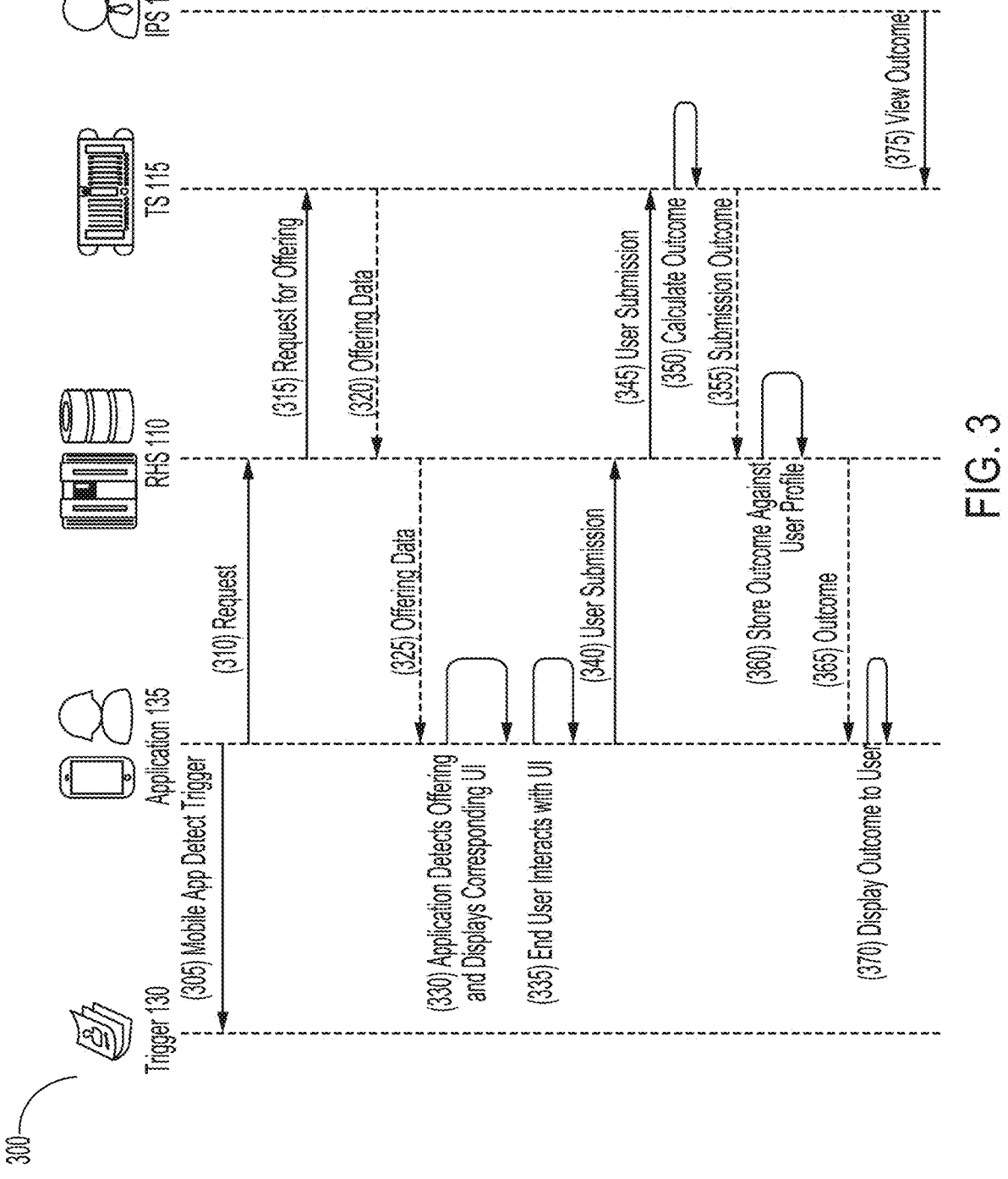
FIG. 3 depicts a function band diagram of an example process of initiating requests in response to triggers.

FIG. 3, among others, depicts a function band diagram of an example process 300 of initiating requests in response to triggers. In brief overview, when the mobile application detects a trigger (305) a request is sent to request handler server 110 (310). The request is decoded, and request handler server 110 requests the offering from the transaction service 115 (315) via an API. The transaction service 115 sends the requested offering data to request handler server 110 via API (320), which then pushes the data to the mobile application (325). The mobile application surfaces the correct process for that offering type (330). The end user interacts with the process (335) and when submitted the information is sent back through request handler server 110 (340) to the transaction service 115 (345). The transaction service 115 generates a result (Outcome) (350) and this is passed to request handler server 110 (355), which persists the outcome against the end user Profile (360) and then passes it to the mobile application (365) where the outcome is displayed to the end user (370). The item provider service can get his own view of the outcome via the transaction service 115 UI (375).

Figure 4:
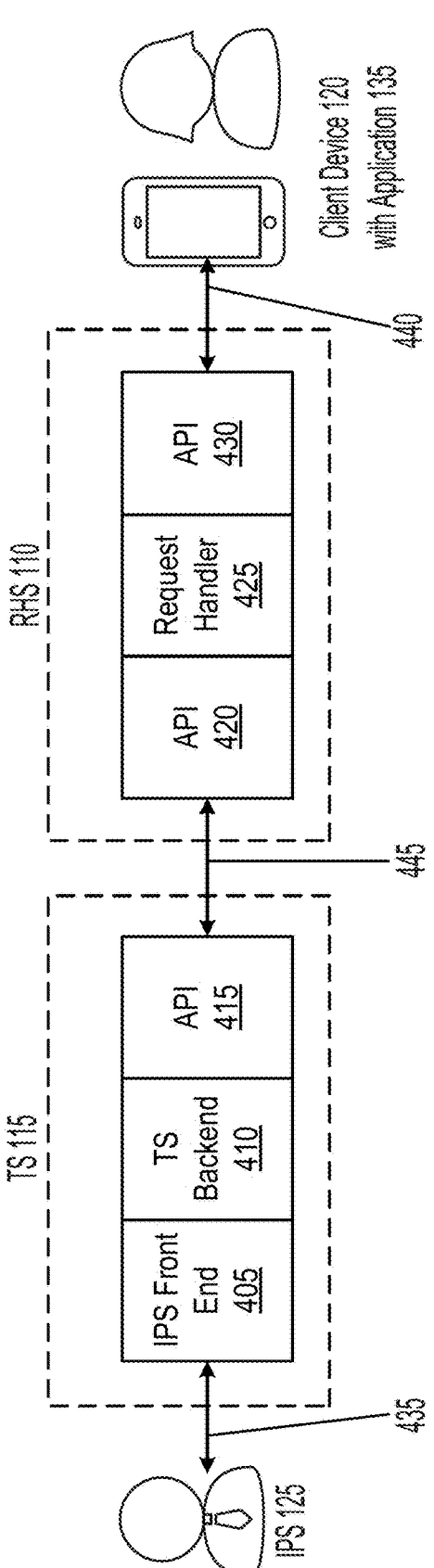
FIG. 4 depicts a block diagram of an example process for indexing triggers for items and initiating requests in response to triggers.

FIG. 4, among others, depicts a block diagram of an example process 400 of indexing triggers for items and initiating requests in response to triggers. The transaction service 115 and the request handler service 110 may interface between the item provider service 125 and the client device 120 with the application 135. Each transaction service 115 may be associated with one of the item provider services 125. The transaction service 115 may encapsulate or include data and logic for the item provider service 125, such as at least one item provider service front end 405 (hereinafter generally referred to as front end 405), at least one transaction service back end 410 (hereinafter generally referred to as back end 410), and at least one application programming interface (API) 415, among others. The request handler service 110 may encapsulate or include routing, aggregation, and trigger information, such as service-side API 420, at least one request handler 425, and client-side API 430, among others. For example, the request handler service 110 may function or act as a router and aggregator, a single point of contact for the client device 120, and handle interacting with the transaction service 115.

The item provider service 125 may communicate with the front end 405 of the transaction service 115 to enter data regarding items via a user interface through data path 435. The back end 410 of the transaction service 115 may process the input entered via the front end 405. In conjunction, the application 135 running on the client device 120 may communicate with the request handler service 110 in accordance with the client-side API 430 through data path 440. The request handler 425 of the request handler service 110 may process the data communicated from the application 135 via the client-side API 430 to select the proper transaction service 115. The service-side API 420 of the request handler service 110 may communicate with the API 415 of the transaction service 115 via data path 445.

Figure 5:
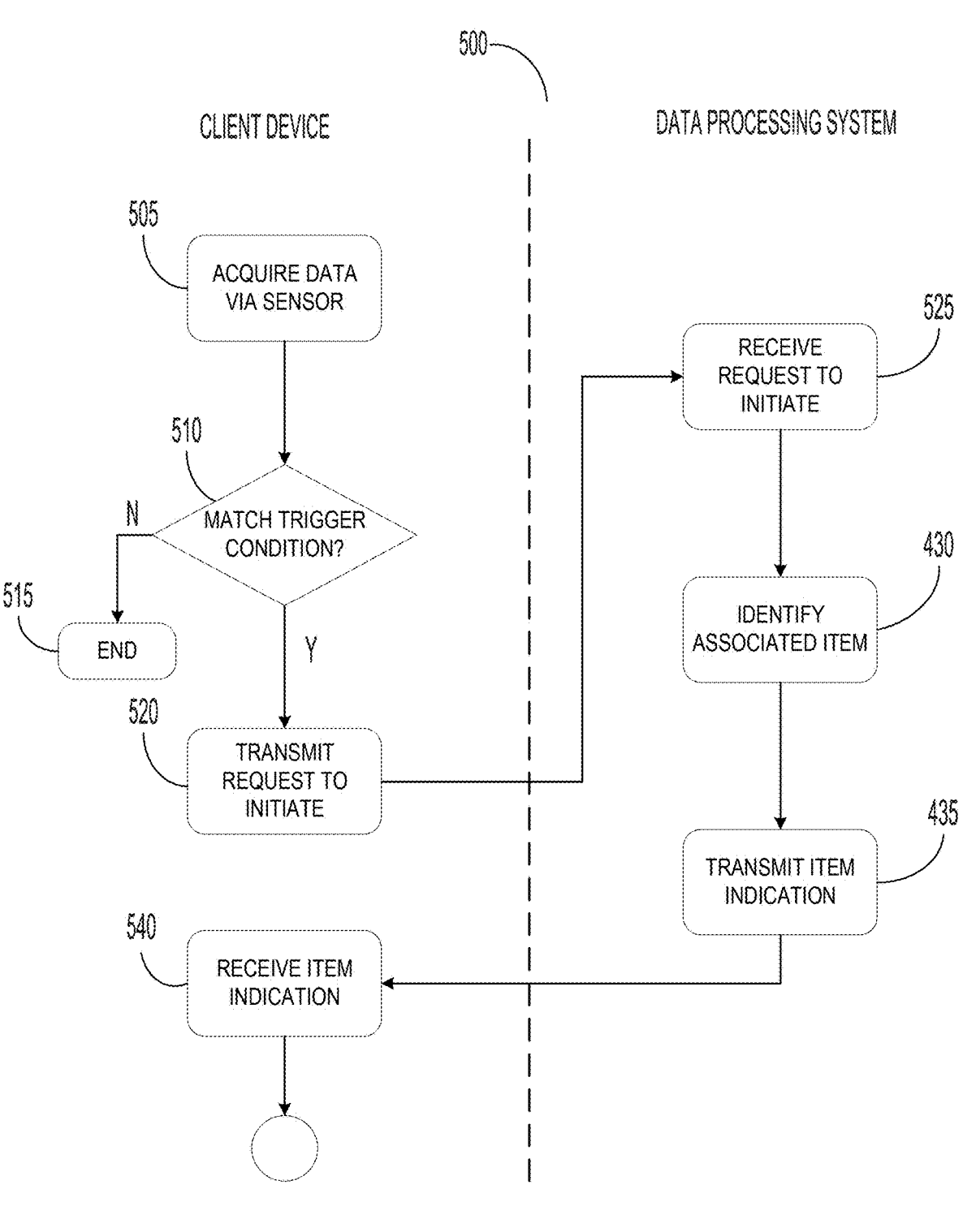
FIGS. 5 and 6 depict a flow diagram of an example method of initiating requests in response to triggers.
Figure 6:
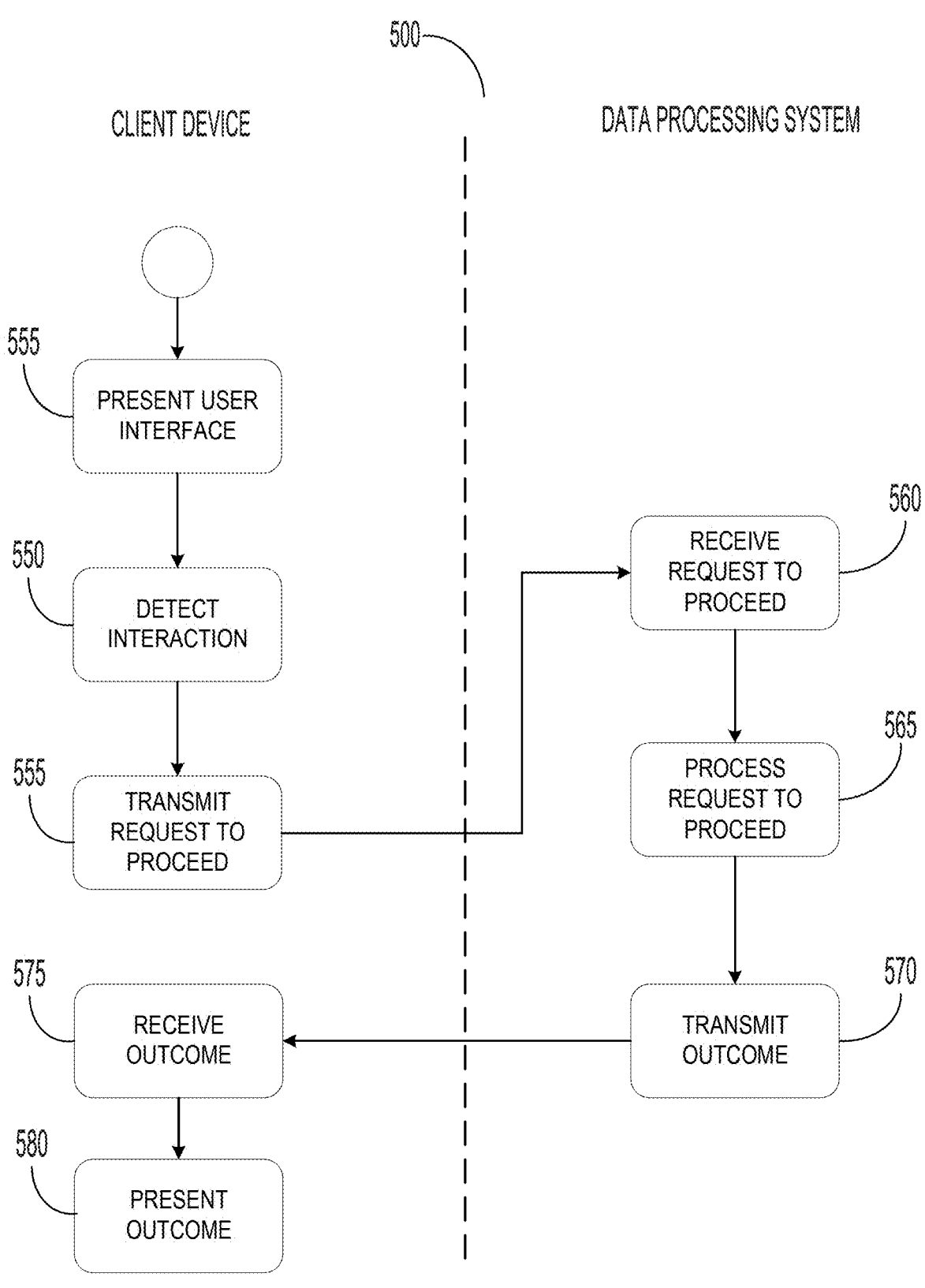

FIGS. 5 and 6, among others, depicts a flow diagram of a method 500 for initiating requests in response to triggers. The method 500 can be performed or implemented using the system 100 or the computer system 4500. A client device 120 can acquire data via sensor (ACT 505). An application 130 running on the client device 120 can acquire the data via one or more sensors, such as an image, audio file, video, a quick response (QR) code, Bluetooth beacon, and global positioning system (GPS) location, among others. The one or more sensors can include a camera, a microphone, a global position system (GPS) device, a near field communication (NFC) unit, and a Bluetooth connector among others. The application 130 may be a plug-in into another or a standalone application.

The client device 120 can determine whether the data matches a trigger condition (ACT 510). The client device 120 compare the data acquired from one of the sensors with one or more of the trigger conditions. Each trigger condition can be specified by an item provider service 125 using a form received in response to a trigger creation form. The trigger condition can be stored and maintained on the client device 120 itself. The trigger condition can be also accessed via a link set and provided by the item provider service 125 through the data processing system 105. Responsive to the determination that the data does not match the trigger condition, the client device 120 can terminate the method 400 (ACT 515).

Conversely, responsive to the determination that the data matches the trigger condition, the client device 120 can transmit a request to initiate to the data processing system 105 (ACT 520). The client application 120 can generate the request to initiate using the data acquired via the sensor. The client device 120 can identify an item identifier corresponding to the matching data. The item identifier can reference or correspond to an offering (e.g., an item) provided by the item provider service 125. The item can include a product (e.g., clothing, to food orders, theatre tickets, downloadable products, and services) or a notification (e.g., service-defined solicitation for information, joining of contact lists, signing petitions, entering contests, request information, or an organization). The request generated by the client device 120 can include the item identifier. The client device 120 can send the request to the request handler service 110 or the transaction service 115.

A data processing system 105 can receive the request to initiate from the client device 120 (ACT 525). The request can be received by the request handler server 110 of the data processing system 105. The data processing system 105 can pares the request to identify the item identifier. The data processing system 105 can identify an associated item (ACT 530). Using the item identifier parsed from the request, the data processing system 105 can identify the associated item. The data processing system 105 can also identify offering data associated with the item. The offering data can include a description of the product or the notification, such as price for the product or notification, name for the product or notification, and provider name, among others. The transaction service 115 associated with the item provider service 125 for the item can maintain and provide the offering data. The data processing system 105 can transmit an item indication to the client device 120 (ACT 535). Using the offering data associated with the item identifier in the request, the data processing system 105 can generate the item indication including the offering data. The request handler server 110 can transmit the item indication to the client device 120.

The client device 120 can receive the item indication from the data processing system 105 (ACT 550). The client device 120 can parse the item identification to identify the offering data received from the data processing system 105. The client device 120 can present a user interface (ACT 555). The client device 120 can generate the user interface for presentation using the offering data. The user interface can include one or more elements to display information regarding the product or the notification provided by the item provider service 125. The user interface can be used to set one or more parameters (e.g., delivery, billing, and provision of user data, among others) to carry out the transaction in relation to the item. The client device 120 can detect an interaction (ACT 550). The client device 120 can detect the interaction on the user interface corresponding to a send a request to the data processing system 105. The client device 120 can transmit a request to proceed to the data processing system 105 (ACT 555). Using the parameters set via the user interface, the client device 120 can generate the request to proceed in response to the detection on the user interface. The request to proceed can include the item identifier and the parameters (e.g., delivery, billing, and provision of user data, among others) specified using the user interface.

The data processing system 105 can receive the request to proceed from the client device (ACT 560). The request to proceed can be received by the request handler server 110 or the transaction service 115. The data processing system 105 can parse the request to identify the item identifier and the one or more parameters set using the user interface presented on the client device 120. The request handler server 110 can identify the transaction service 115 corresponding to the item provider service 125 associated with the item identifier. The data processing system 105 can process the request to proceed (ACT 565). The request handler server 110 can forward or send the request to the identified transaction service 115. The data processing system 105 can carry out the transaction in accordance to the one or more parameters included in the request to proceed. The data processing system 105 can transmit an outcome to the client device 120 (ACT 570). The data processing system 105 can generate the resultant outcome in carrying out the transaction. The outcome can include whether the carrying out of the transaction is a success or a failure. The outcome can also include the one or more parameters received in the request to proceed.

The client device 120 can receive the outcome from the data processing system 105 (ACT 575). The client device 120 can parse the outcome to identify indication of success or failure. The client device 120 can also parse the outcome to identify the one or more parameters. The client device 120 can present the outcome (ACT 580). The outcome can be presented on a user interface via the client device 120. The application 130 running on the client device 120 can present the outcome on the previous interface or a different interface.

Figure 7:
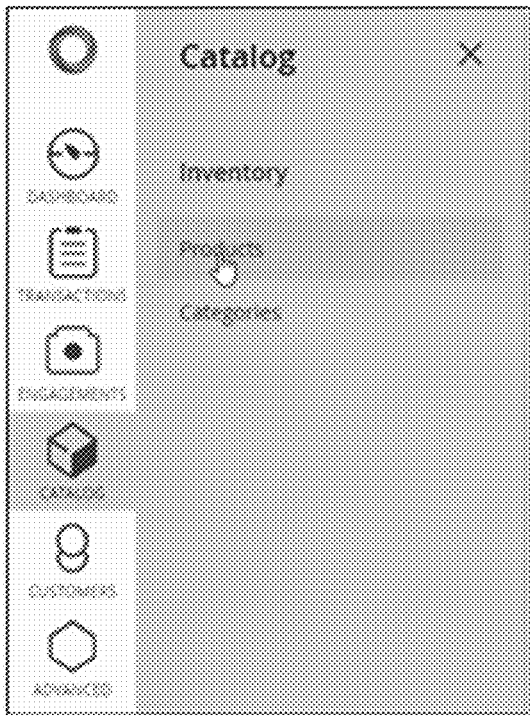
FIGS. 7-10 depict screenshots of an example user interface for an item provider service process for indexing an item.
Figure 8:
Figures 9, 10:
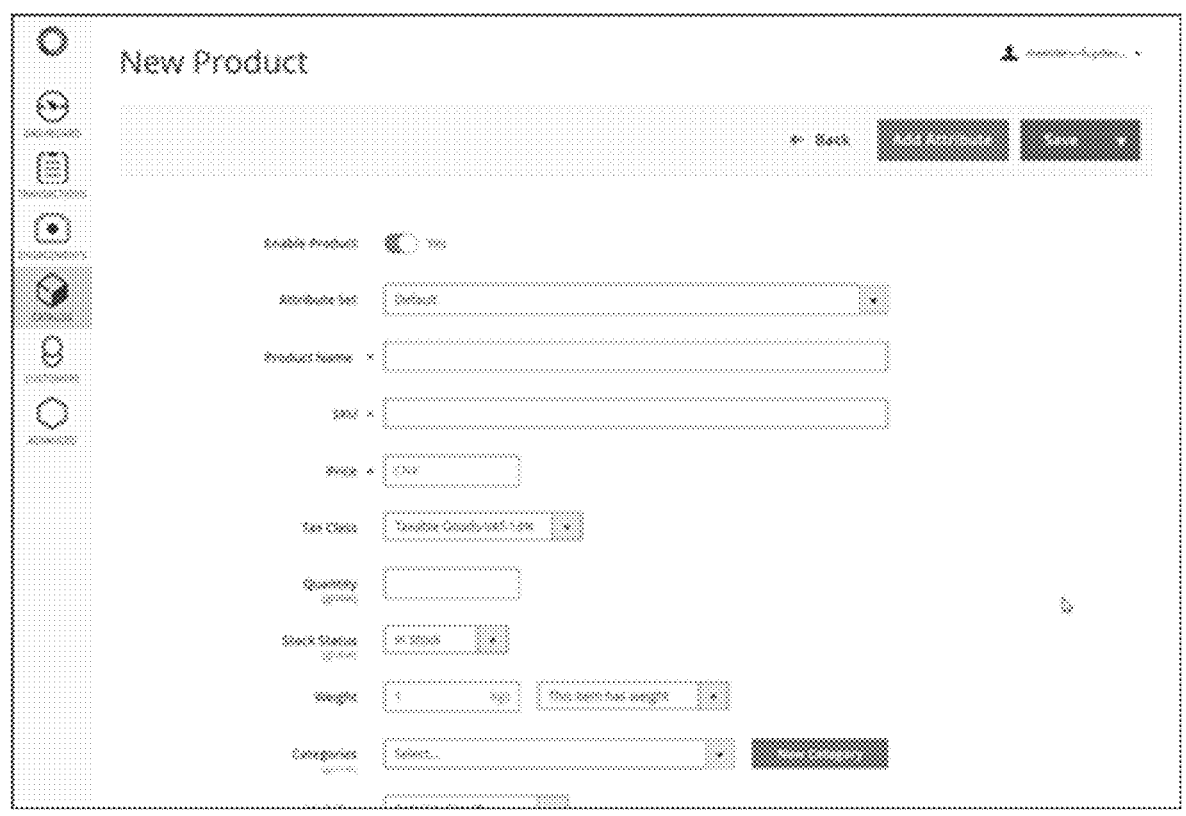

FIGS. 7-10 depict screenshots of an example user interface for an item provider service process for indexing items. In FIG. 7, an administrator of the item provider service can log into the transaction service 115 and can navigate to "Catalog >Products." In FIG. 8, the administrator of the item provider service can choose "Add Product." In FIG. 9, the item provider service can receive the "Add Product" form. The add product form can allow for many permutations of product, from physical products with weight, to virtual downloadable products, to services. Products can have virtually unlimited attributes, and the item provider service can choose to offer choices to the end user, such as size, color, or style, which can affect the product price. The item provider service can optionally upload image and video files to represent the product. The product can be assigned to one or more presentation categories In FIG. 10, Upon saving the product, the item provider service receives confirmation that the data was saved. At this point, the administrator of the item provider service can continue to edit the product, or return to the main product list. Editing a product can be similar to creating a new product, except the item provider service starts with the product form fields already populated with data.

Figure 11:
FIGS. 11-14 depict screenshots of an example user interface for an item provider service process for creating categories for items.
Figure 12:
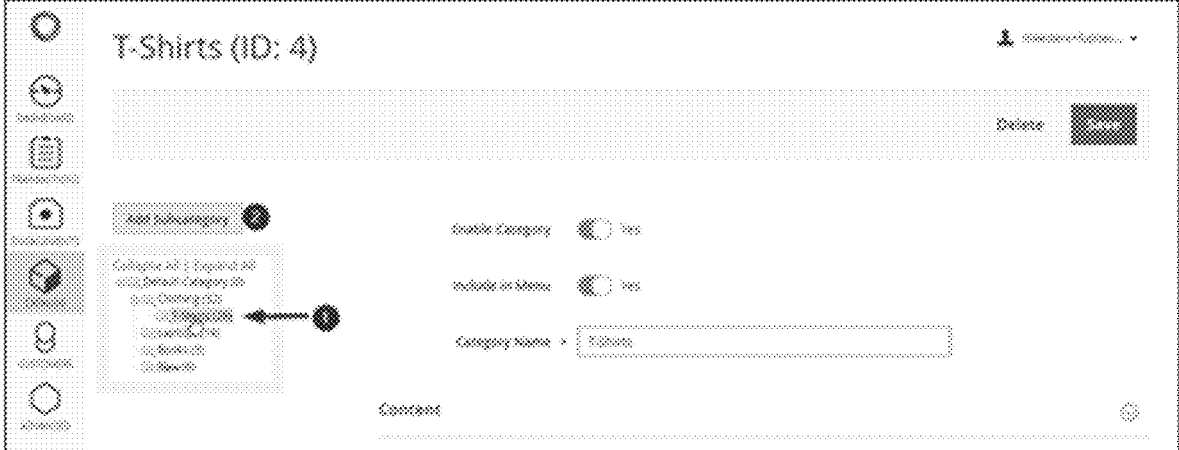
Figures 13, 14:
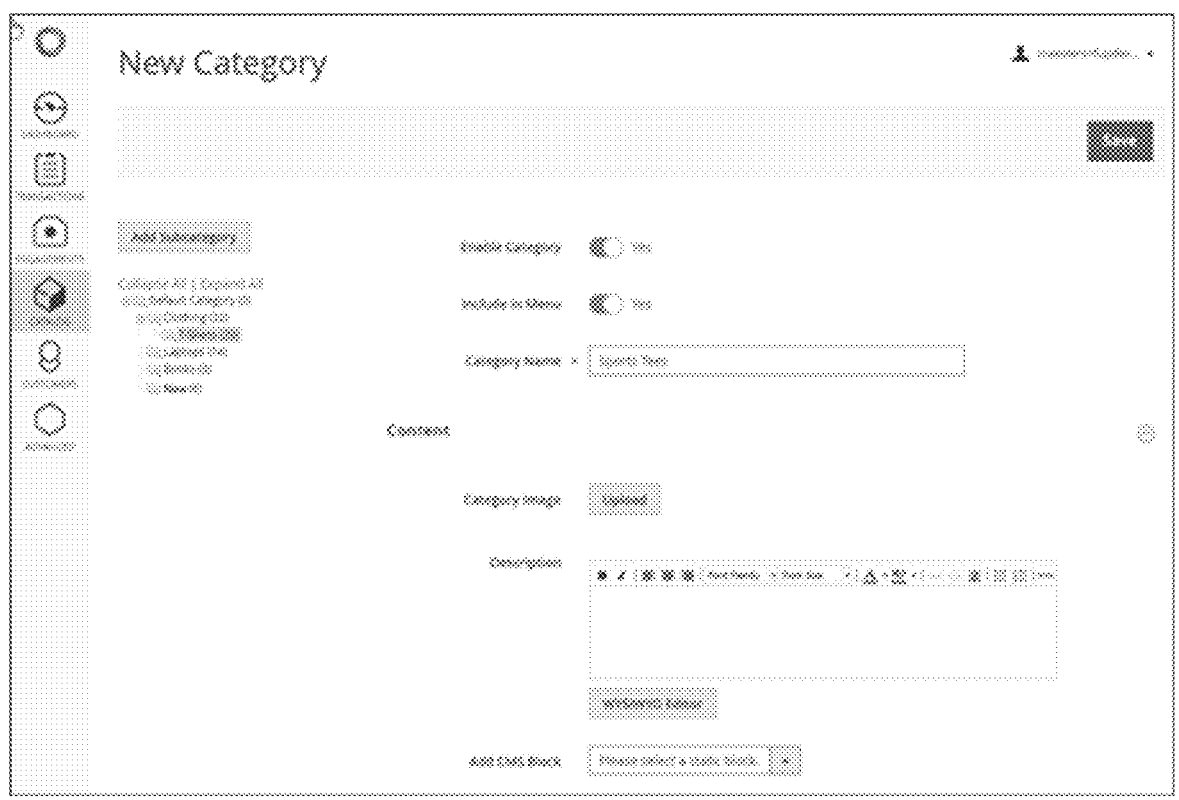

FIGS. 11-14 depict screenshots of an example user interface for an item provider service process for creating categories for items. In FIG. 11, the administrator of the item provider service can log into the transaction service 115 and can navigate to "Catalog >Categories." In FIG. 12, the item provider service is deposited at the root of the category structure, in the default category. The administrator of the item provider service can have the option to navigate into a subcategory if desired (1) or can go straight to creating a new subcategory by pressing the add subcategory button (2). In FIG. 13, the item provider service is presented with the "Create Category" form. Here, the item provider service can add metadata about the category, including description, images, as well as specify behavior, such as if the category should be available in system menus. Lastly, the item provider service has the opportunity to browse the list of existing products, and choose any that should be added to this new subcategory. In FIG. 14, after filling out the Category, the item provider service can click save, and may be presented with confirmation that the category was created. At this point, the item provider service can either continue to the edit the current category, or navigate away for other tasks.

Figure 15:
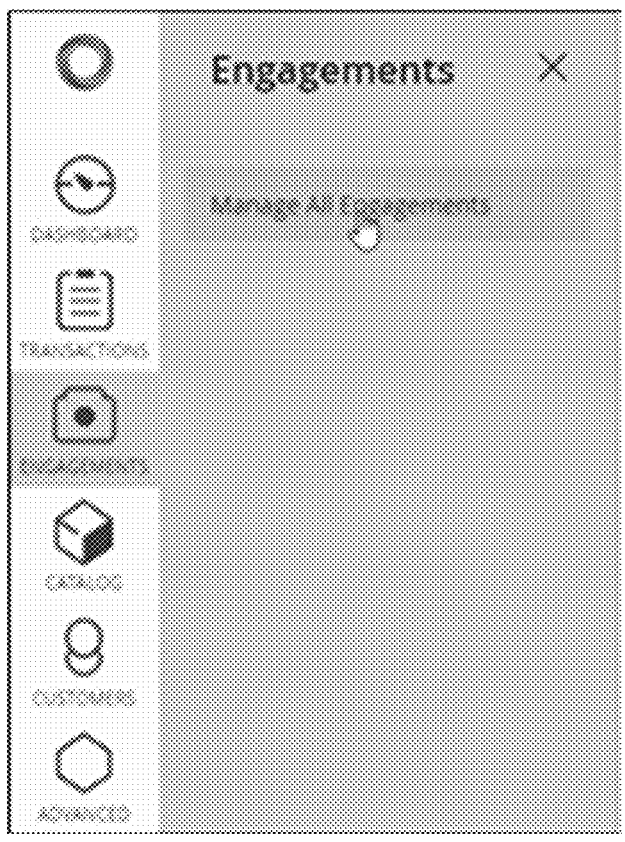
FIGS. 15-21 depict screenshots of an example user interface for an item provider service process for linking triggers.
Figure 16:
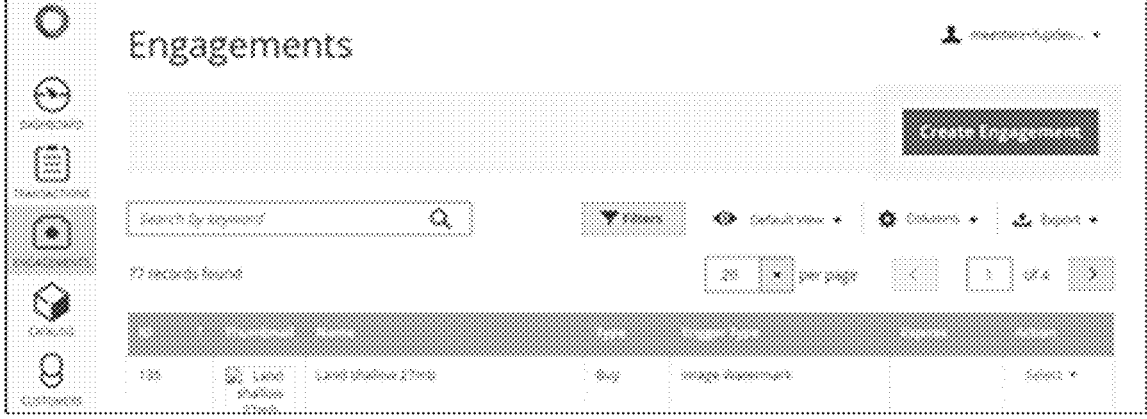
Figure 17:
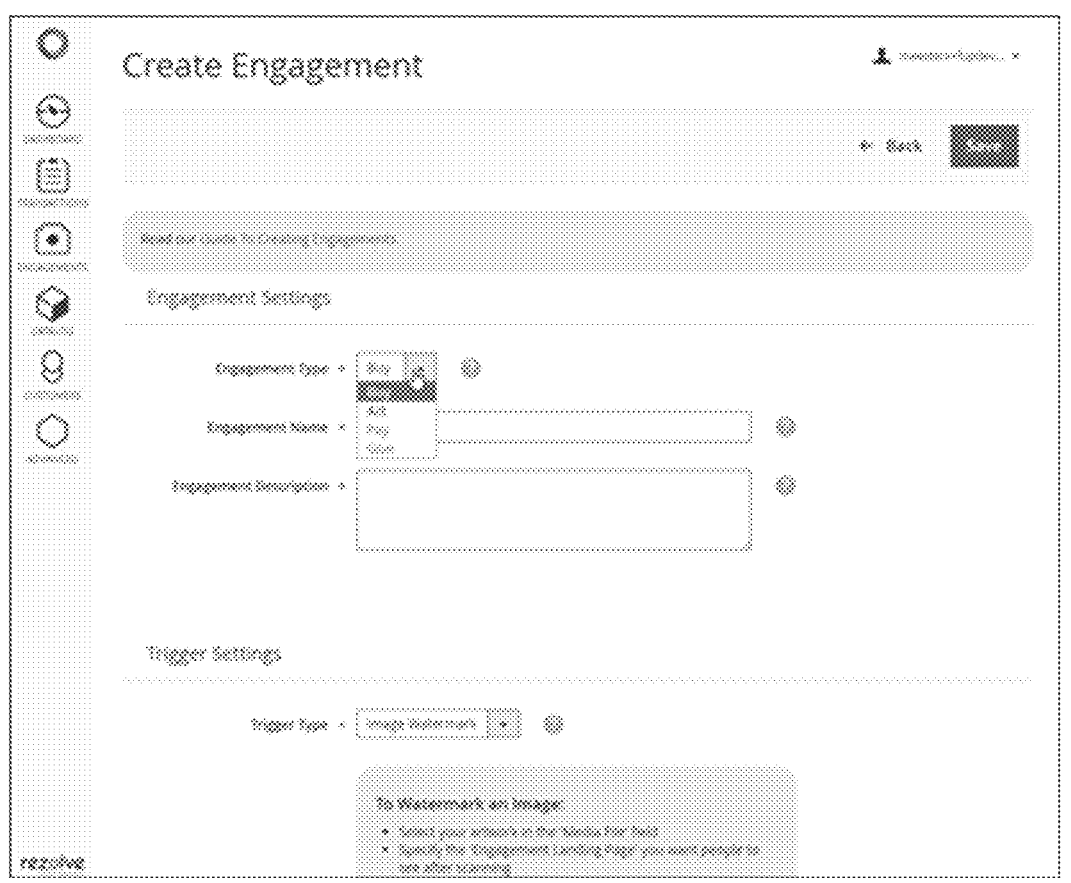
Figure 18:
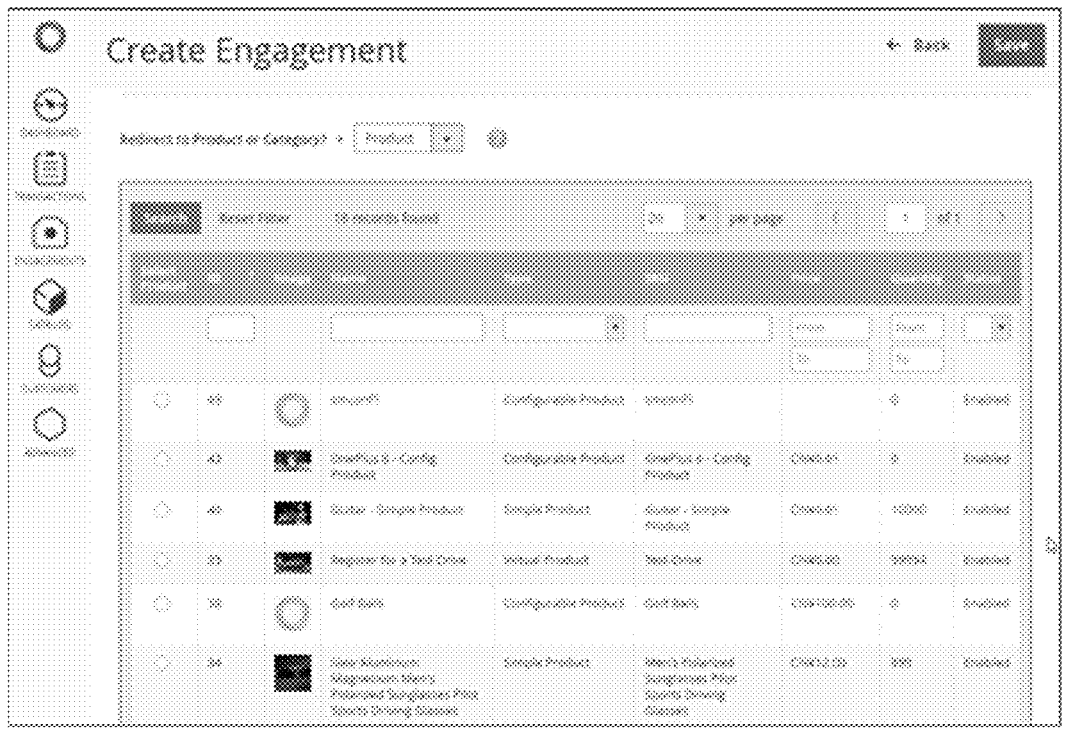
Figure 19:
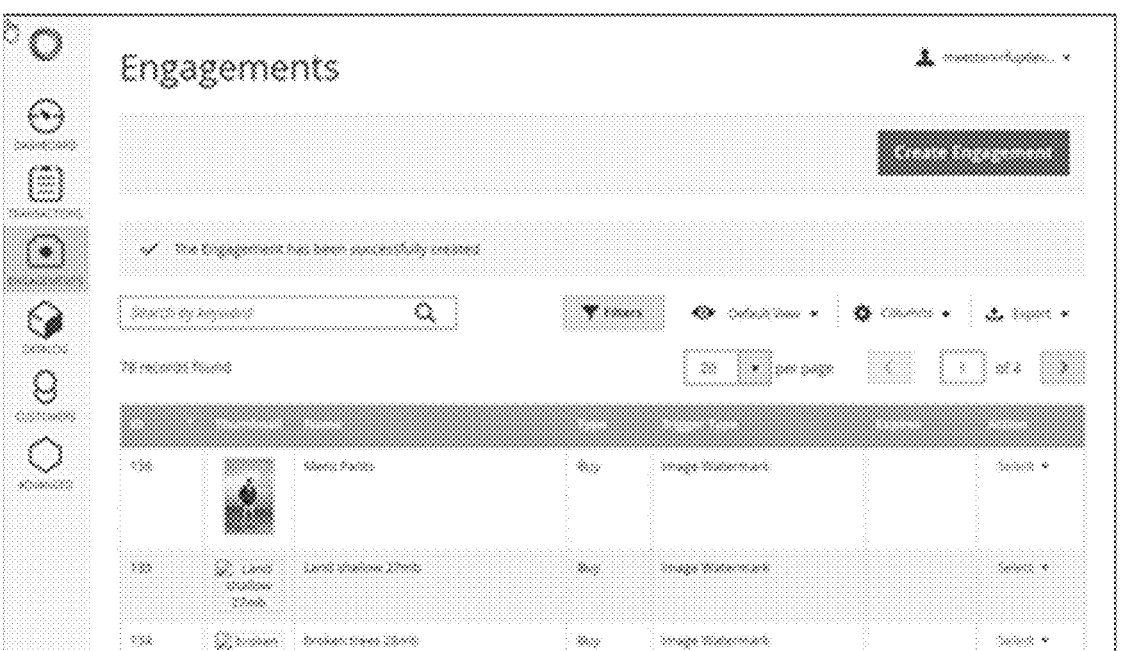
Figure 20:
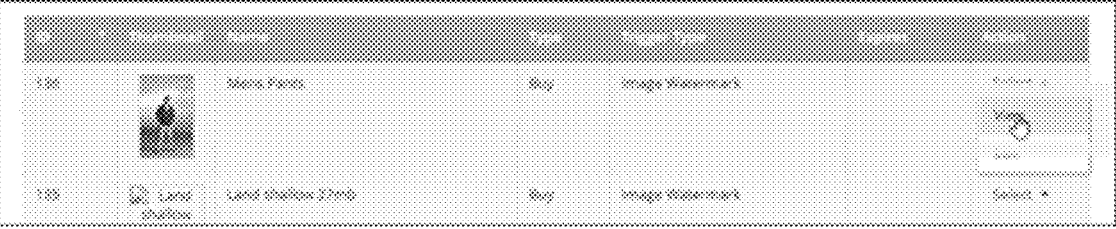
Figure 21:
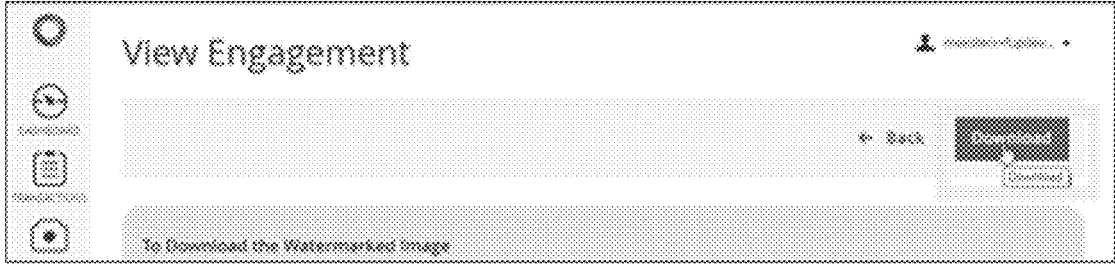

FIGS. 15-21 depict screenshots of an example user interface for an item provider service process for linking triggers. In FIG. 15, the administrator of the item provider service logs into the transaction service 115 and navigates to "Engagements >Manage All Engagements." In FIG. 16, the administrator of the item provider service can arrive at a list of existing Engagements, and can choose the "Create Engagement" button. In FIG. 17, the item provider service is presented with the "New Engagement" form. Here the item provider service may be prompted to choose the Engagement Type (offering type-Product, category, Act), provide a name and description, choose the trigger type (Image, Audio, QR, Bluetooth Beacon, etc. The item provider service may be prompted to upload media, if appropriate for the trigger type. In FIG. 18, the item provider service may be lastly prompted to choose a specific offering to link to. In FIG. 19, upon choosing an offering and pressing the Save button, the item provider service is presented with confirmation that the Engagement has been created. In FIG. 20, the administrator item provider service can now go and download the finished Engagement, which is a particular choice of trigger combined with a particular offering. The administrator can perform this by going to "View the Engagement." In FIG. 21, on the View Engagement page, the item provider service can click the download button to download the specially encoded media file, which can be detected by smartphone sensors, like camera, microphone, or GPS, depending on the media type. At this point, the administrator of the item provider service can use the Engagement in advertising media such as Print, Television, Radio, or Streaming Internet.

FIGS. 22-27 depict screenshots of an example user interface for an item provider service process for creating notifications. A notification within the system may be defined as a product that has no price and no weight. The notification can offer customizable fields that can be used to request information, as well as fields for items like name, email, phone, and address. While a notification is based upon a product, and can be created like a product using the Create Product process, the notification may have a separate shortcut method for creating notifications for the convenience of the item provider service.

Figure 22:
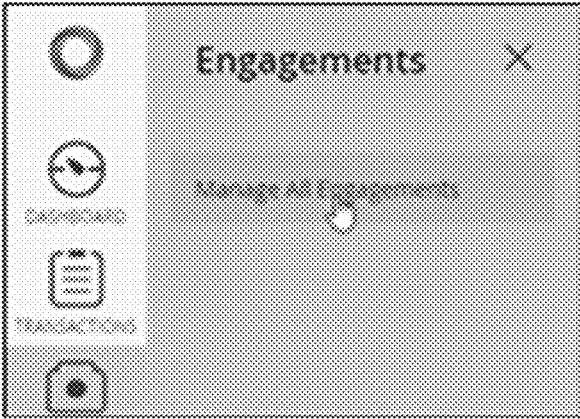
Figures 23, 24:
Figure 25:
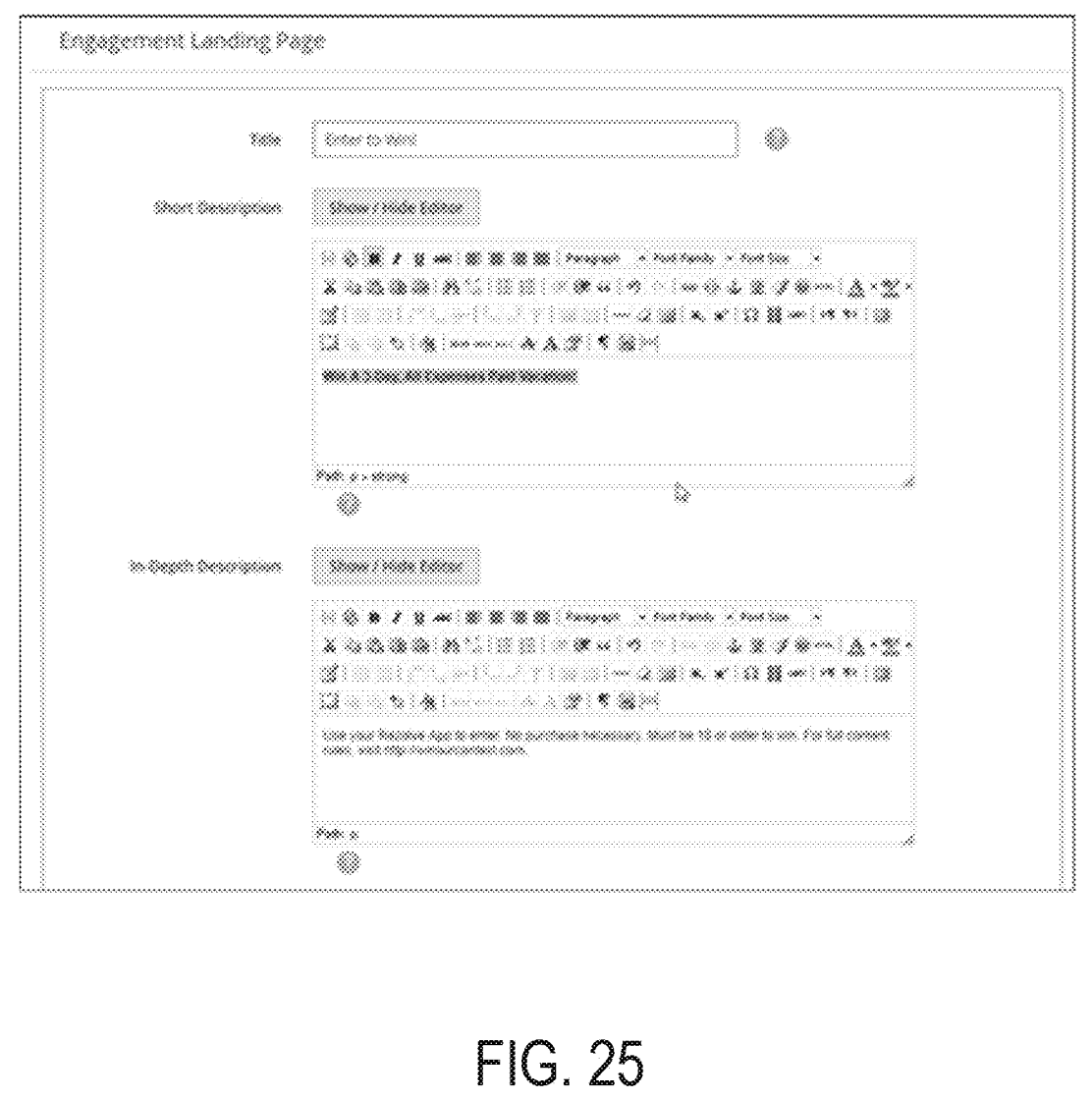
Figure 26:
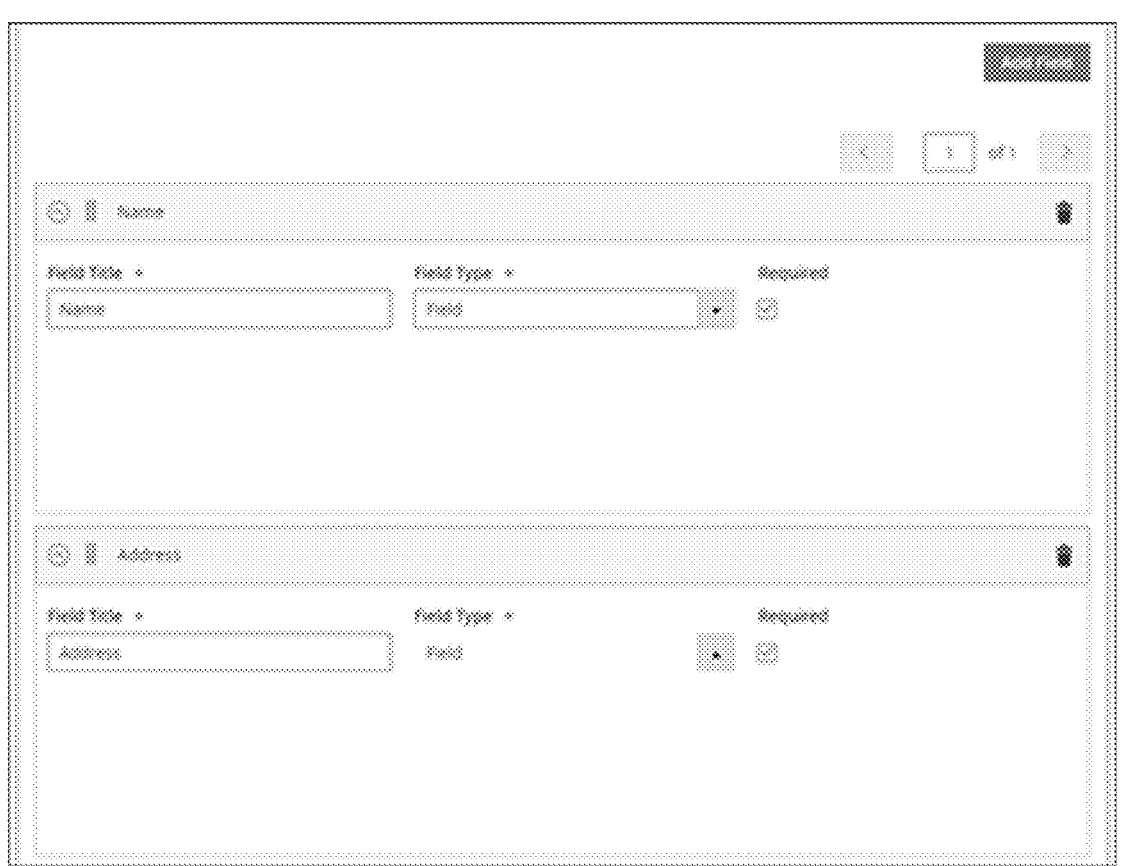
Figure 27:
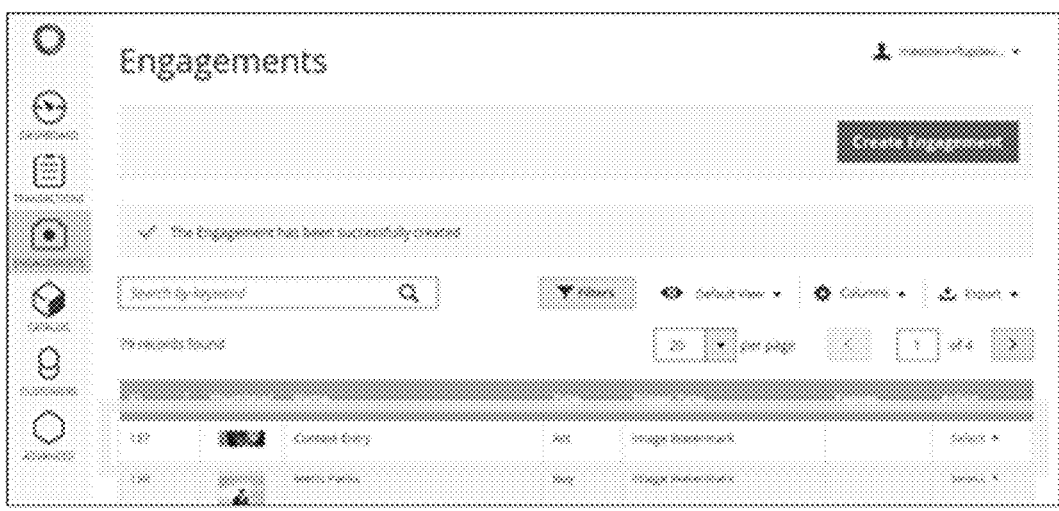

In FIG. 22, an administrator of the item provider service can log into the transaction service 115 and can navigate to "Engagements >Manage All Engagements." In FIG. 23, the item provider service arrives at a list of existing Engagements, and chooses the "Create Engagement" button. In FIG. 24, on the Create Engagement form that results, the item provider service chooses the notification type. The parts of the form that deal with the trigger stay the same as in the "Create and Link trigger process." The item provider service may be prompted to provide a name, choose a trigger type, and optionally upload supporting media. In FIG. 25, instead of picking an existing offering, the item provider service is given form fields to define the notification landing page, and the form questions to ask the end user. In FIG. 26, upon saving, a new "Engagement" is created, and the type is listed as act. In FIG. 27, the item provider service can download the Engagement, the same as in the trigger flow before.

Figure 28:
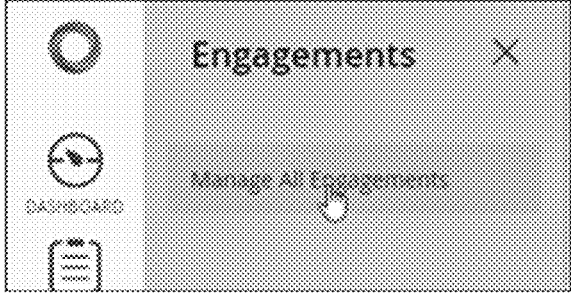
FIGS. 28-30 depict screenshots of an example user interface for an item provider service process for editing a triggering-offering combination.
Figure 29:
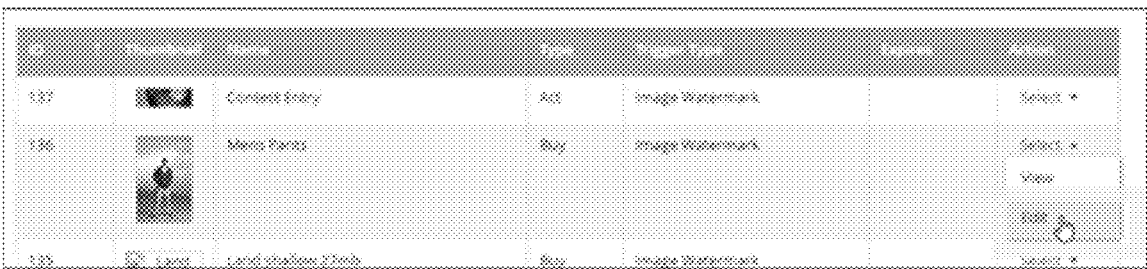
Figure 30:
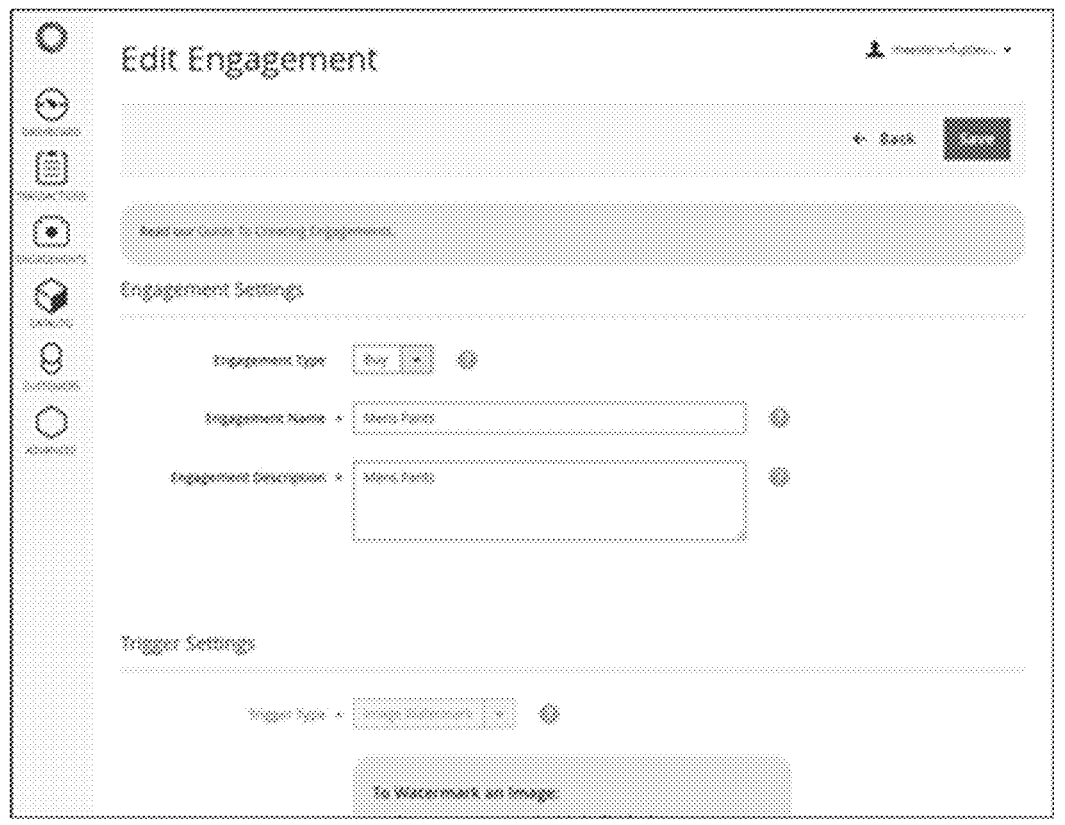

FIGS. 28-30 depict screenshots of an example user interface for an item provider service process for editing a triggering-offering combination. Editing a trigger/offering combo (also referred herein as an "Engagement") may be similar to creating one, except the item provider service may start with a prepopulated form. In FIG. 28, an administrator of the item provider service logs into transaction service 115 and navigates to "Engagements >Manage All Engagements." In FIG. 29, the administrator of the item provider service picks an "Engagement," and clicks "Edit." In FIG. 30, the transaction service 115 can bring up the Edit Engagement form. This may be the same as the Create Engagement form except the prompt may be already populated with data. The item provider service can change the name, change the media file, or change the linked offering, but trigger Type may remain the same. When the item provider service saves changes, they are presented with the same "The Engagement has been successfully created" message as before.

If the media file was not changed, the item provider service may not need to re-download the engagement. The downloaded item may not store a direct reference to the linked offering, but rather an ID that is used to look up the offering in the database. For example, an item provider service can create an image-based Engagement, and can link the engagement to a certain product, and then publishes the encoded image in a magazine. After three weeks of sales, the product may run out. Having the ability to edit the Engagement provides the item provider service a recourse, and the item provider service can redirect the image to an alternate, in-stock product, avoiding end user frustration.

Figure 31:
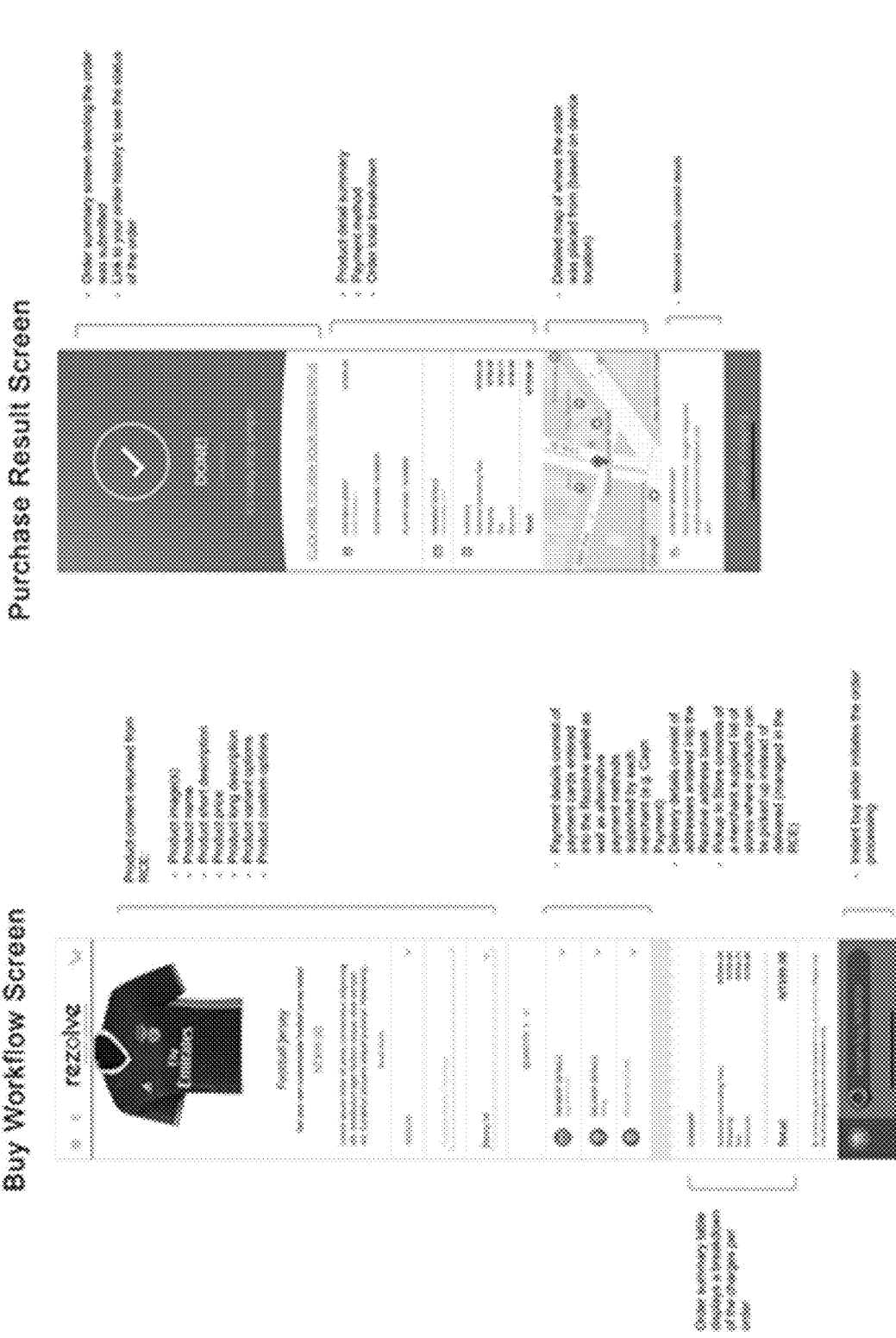
FIGS. 31 and 32 depicts screenshots of an example user interface for an application on a client device for initiating a transaction.
Figure 32:
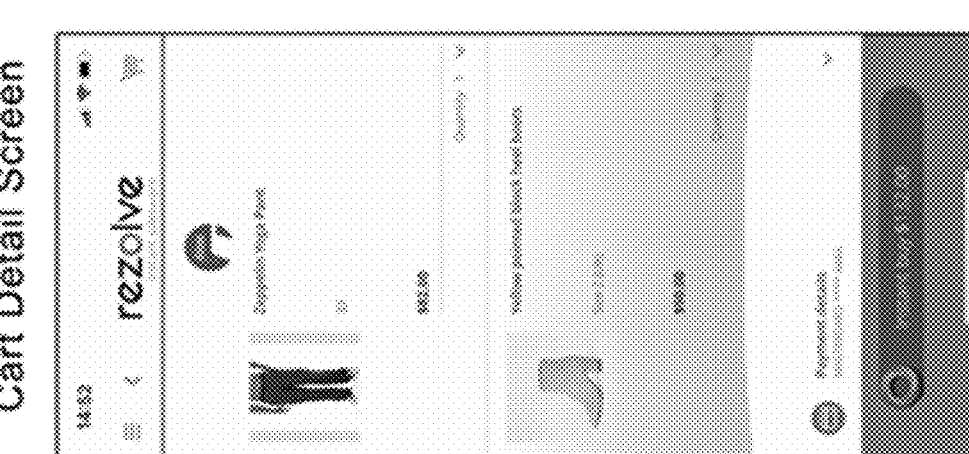
Figure 32:
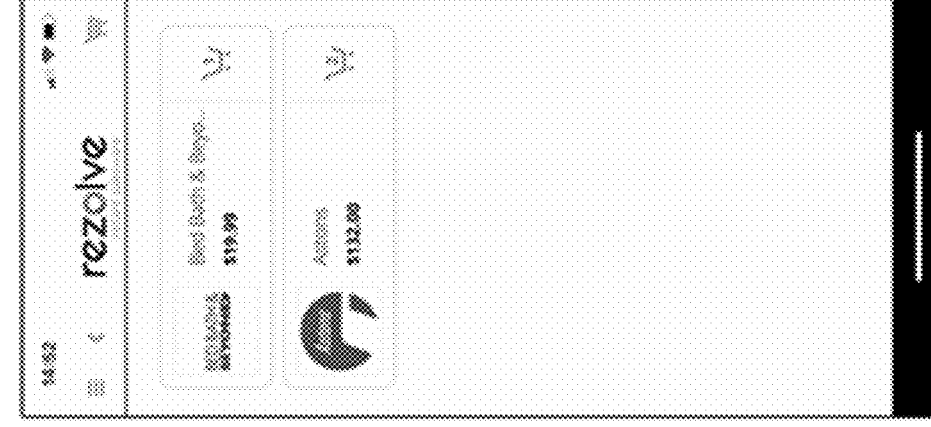

FIGS. 31 and 32 depicts screenshots of an example user interface for an application on a client device for initiating a transaction. The purchase process may be presented when a trigger is scanned for a product or service offering type, where the intended outcome is a purchase of goods or services. First, the end user can scan a trigger linked to an offering of a product or a service. Second, the request handler server 110 can return to the mobile application product data. The product data can include a title, short description, long description, one or more product images, various product attributes as defined by the item provider service (such as material, pattern, country of manufacture, etc.), product variants the end user can choose from (such as size or color), and pricing data, among other information. Third, the application can initiate the purchase process, formatting the screen to display the product information, images, and price, among others. Fourth, the end user may be prompted to choose shipping options and payment options. Fifth, the end user can initiate an Instant Purchase by using the "Slide to Buy" control, buying the single item as depicted along the left in FIG. 31. The end user will be taken to the Purchase Result Screen as depicted along the right in FIG. 31.

In addition, as depicted in FIG. 32, the end user can add the item to their Cart, which causes the cart icon to update. At this point the end user may: scan a different trigger, and add more items to the cart; click the cart icon in the upper right, choose the cart from the "Cart Selection Screen, and complete their purchase from the "Cart Detail Screen," in a fashion similar to "Instant Purchase"; or abandon the app, and come back later. The cart can contain the item(s). It should be noted that if the end user adds items from multiple item provider services to the cart, a separate cart will be maintained for each item provider service. The carts will persist until the end user either purchases the items, or removes them from the cart(s).

FIGS. 33-38 depicts screenshots of an example user interface for an application on a client device for specifying delivery parameters (also referred herein as the "Click and Collect Process"). This process can be associated with the purchase process. If the item provider service enables the "Pickup in Store" shipping option, the end user can choose to pay online and pick up the product at a local store. The item provider service must then complete the workflow by fulfilling the ordered item, and marking the product shipped. This process has end user and Item provider service components.

Figure 33:
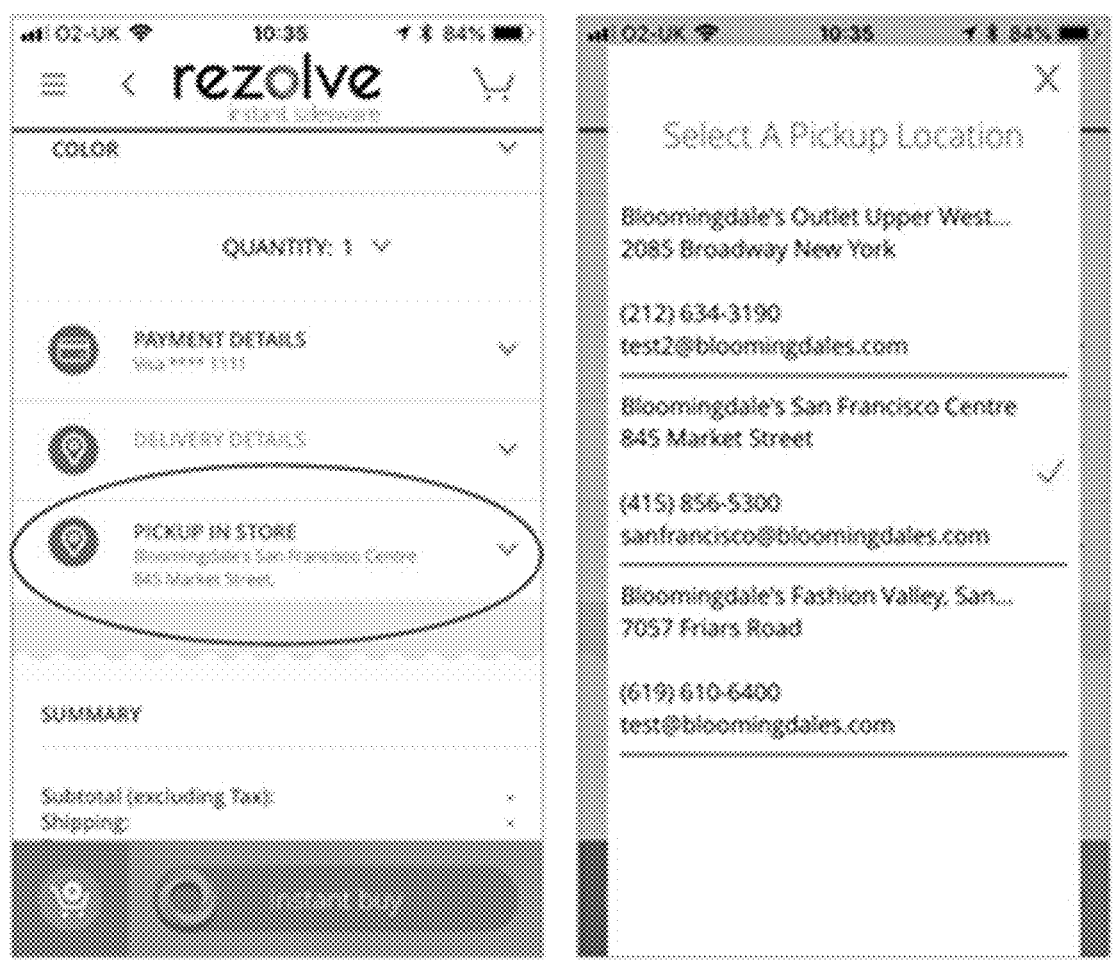
Figure 35:
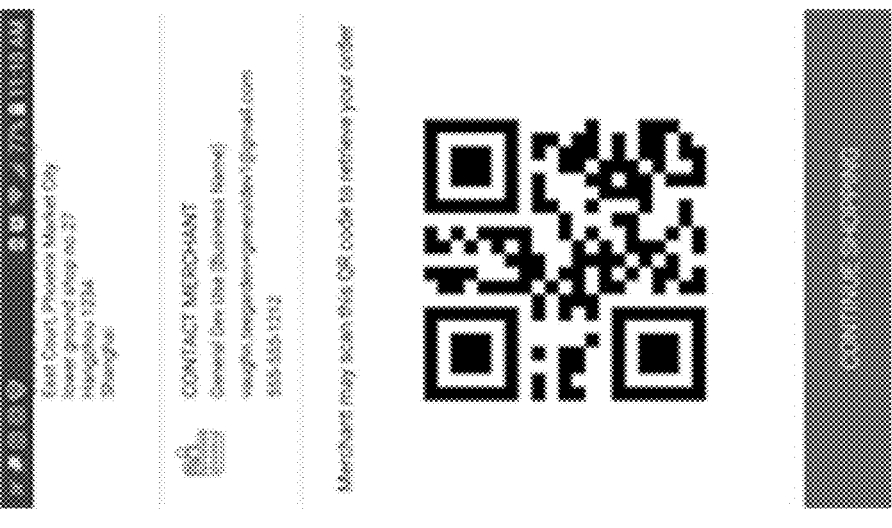
Figure 34:

In FIG. 33, when the end user is checking out, they can choose the "Pickup in Store" shipping option (if enabled by the item provider service). Upon clicking, the end user will be presented with a list of local stores, and can choose the one where they want to pick up their product(s), and continues with the process. In FIG. 34, the onscreen purchase receipt can contain a map to the chosen pick-up location, and can help the end user find the pick-up location. In FIG. 35, the receipt can also contain a QR code. With the application, the item provider service can scan this in-store to mark the order as completed.

Figure 36:
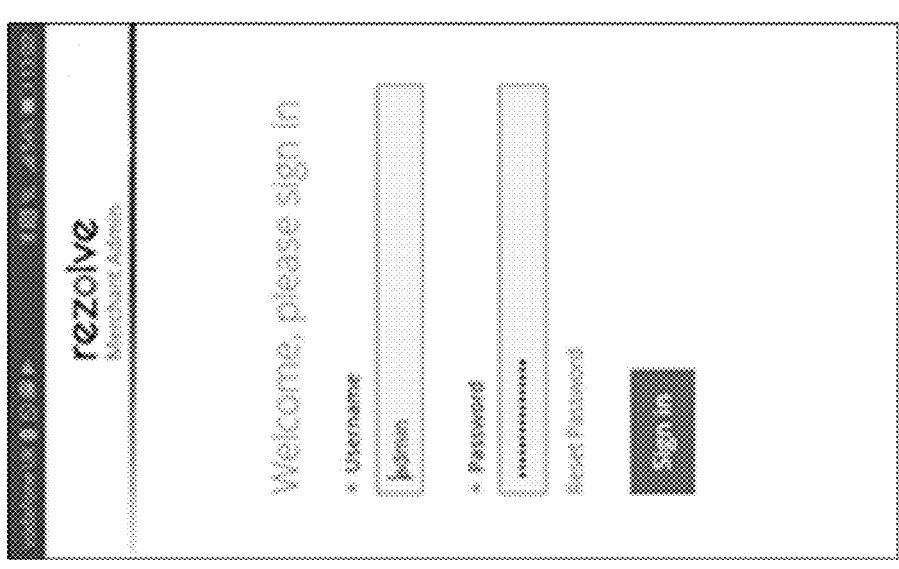
Figure 37:
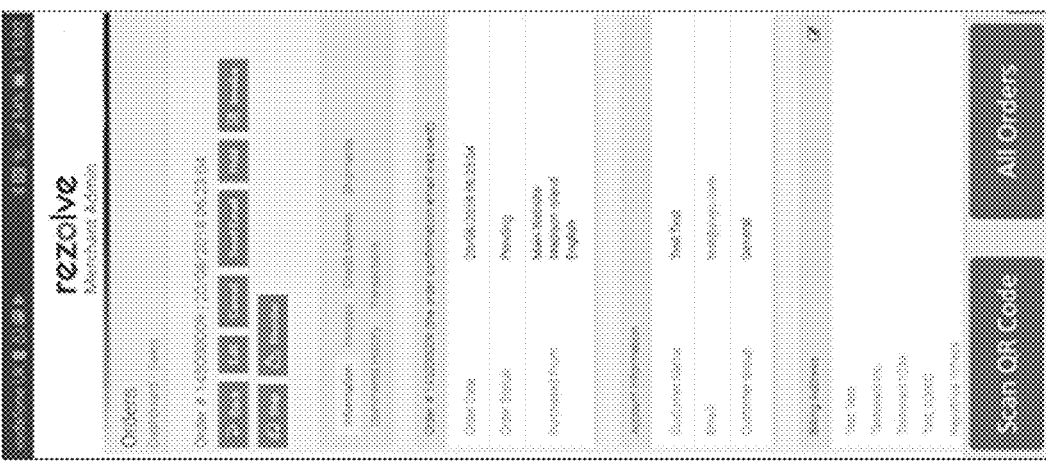
Figure 37:
Figure 37:
Figure 38:
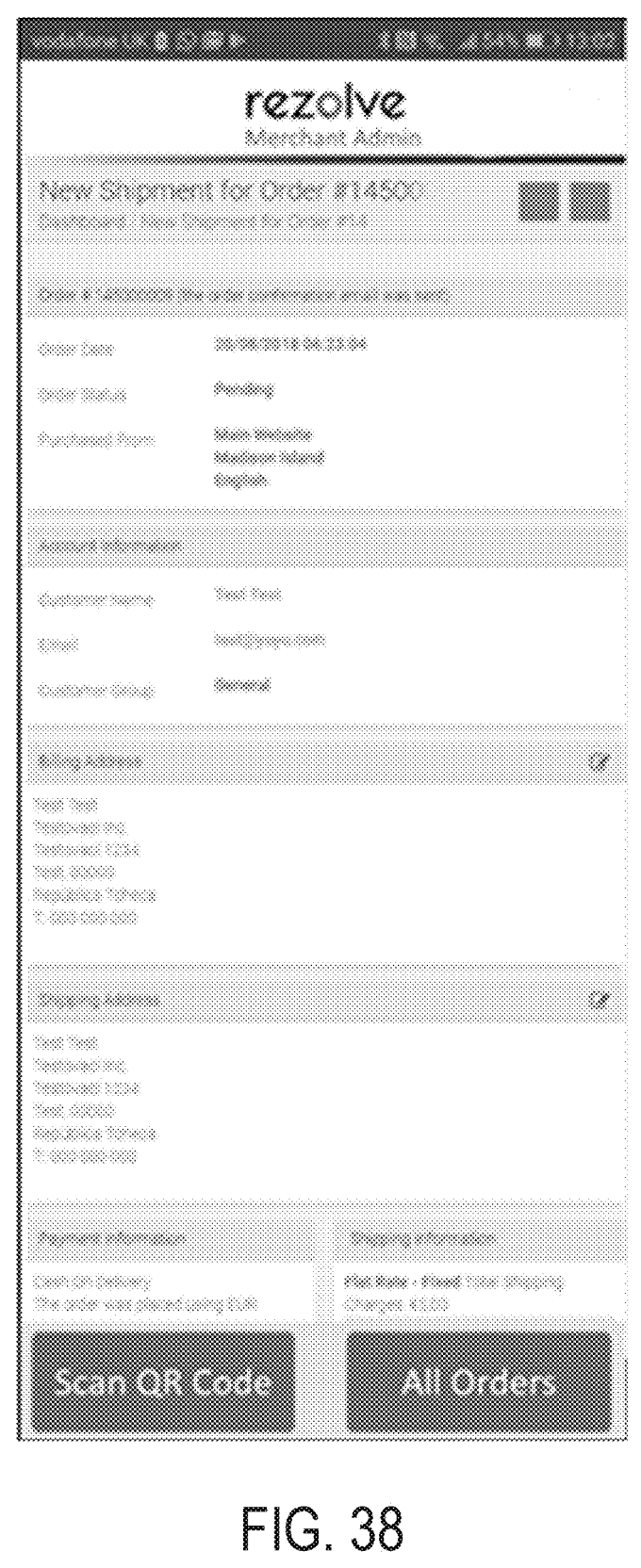

To aid in the Click and Collect process, an item provider application utilizing the transaction service 115 APIs can be created. In FIG. 36, the item provider service can log into the item provider service application. In FIG. 37, the item provider service can scan the QR code on the receipt of the customer, and is taken to the corresponding order. In FIG. 38, the item provider service can then use the "Ship" option to mark the order as "Shipped", completing the order. The depicted example shows the most direct order fulfillment route. However, the item provider service can utilize more complex options, such as partial fulfillment, creating invoices, or issuing credit notes. The item provider service may also perform order fulfillment actions directly in the RHS, but the app is considered more convenient, both for portability and for the QR Scan integration.

Figure 39:
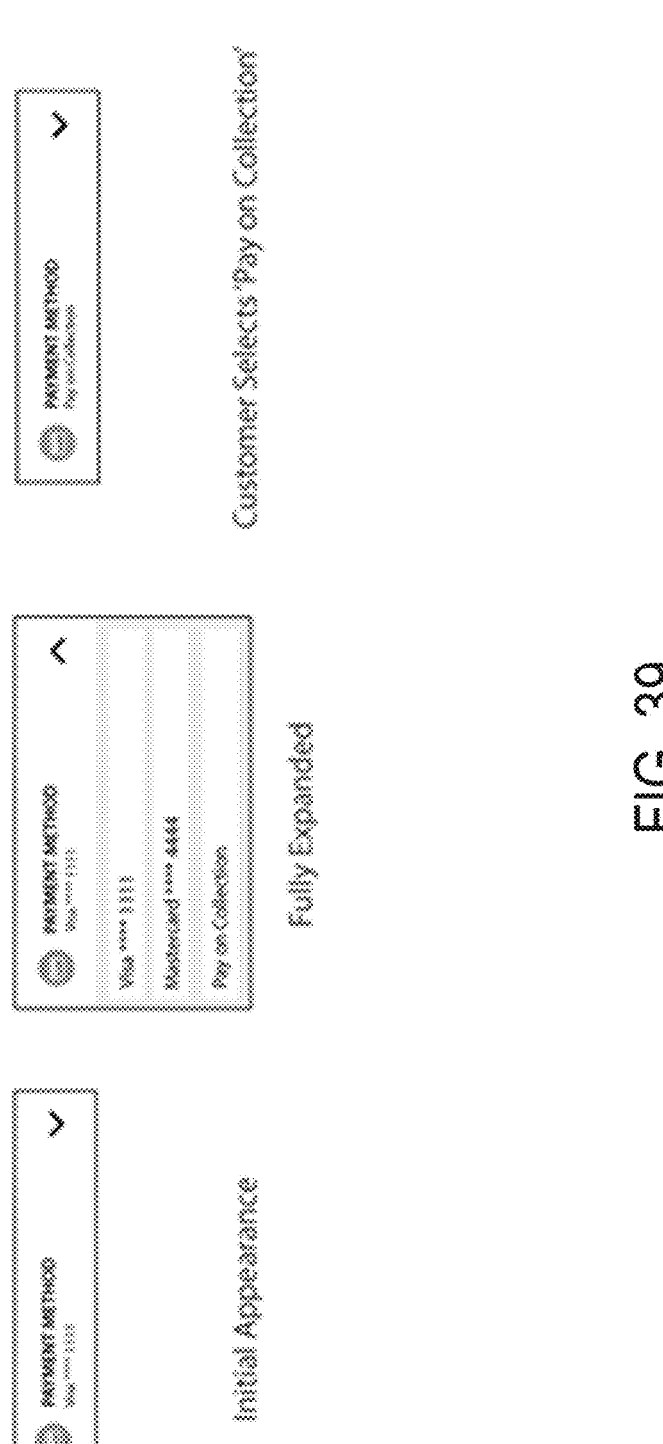
FIG. 39 depicts screenshots of an example user interface for an application on a client device for specifying billing parameters.
Figure 40:
FIGS. 40 and 41 depicts screenshots of an example user interface for an application on a client device for category browsing.

FIG. 39 depicts screenshots of an example user interface for an application on a client device for specifying billing parameters. The billing parameters process can be associated with the delivery parameters process. Instead of taking payment online, the end user can choose to pay in person with cash when they pick up their product. In FIG. 40, this process can be initiated when the end user picks "Pay on Collection" from the payment dropdown. The rest of the order process proceeds as with the Click and Collect process. The end user must pay cash when arriving at the store to pick up their product.

FIG. 40 depicts screenshots of an example user interface for an application on a client device for category browsing. The Category Browse process may be presented when a trigger is scanned for a category offering type, where the intended outcome is for the end user to browse a category of goods. First, the end user can scan a trigger linked to category offering. Second, the request handler server 110 can return to the mobile application Category Data, which can include a title, short description, a category image, and any subcategories and/or products in the linked category, among others. Third, as the end user can click through the presented subcategories, until arriving at a product they want to buy. At the point the end user picks a product, the flow is the same as the buy product workflow when the product is displayed. The customer can either instant purchase or add the product to the cart. Unlike the buy process, the end user has the option to leave the product page, and return to category browsing, to locate other products.

Figure 41:
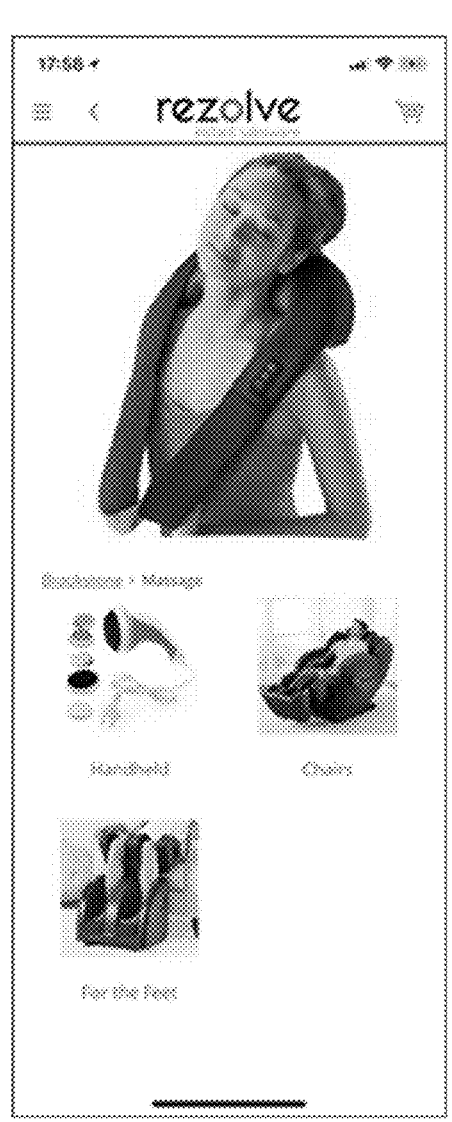
Figure 41:
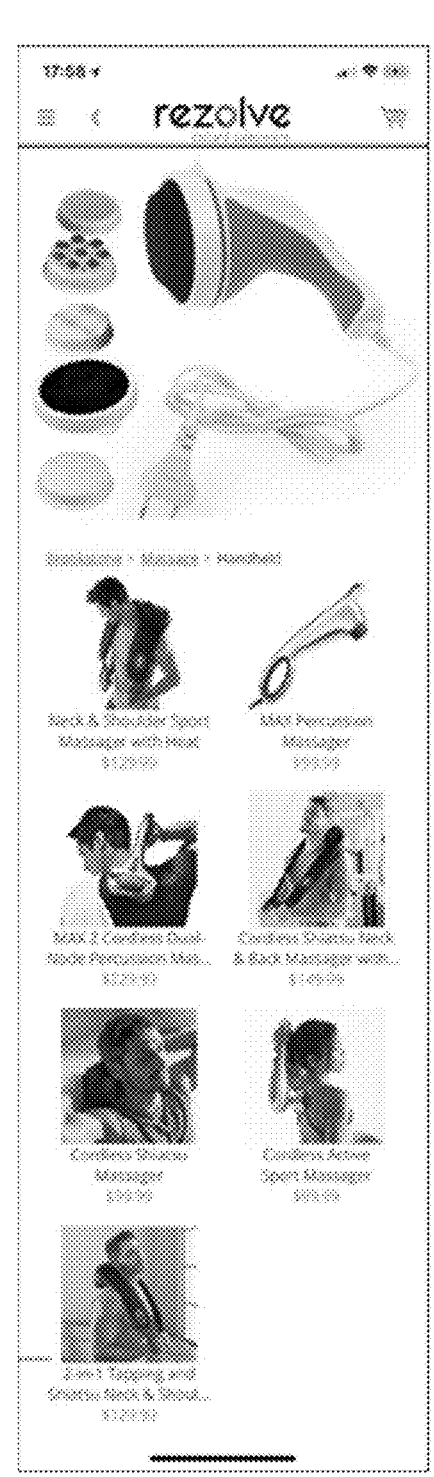
Figure 42:
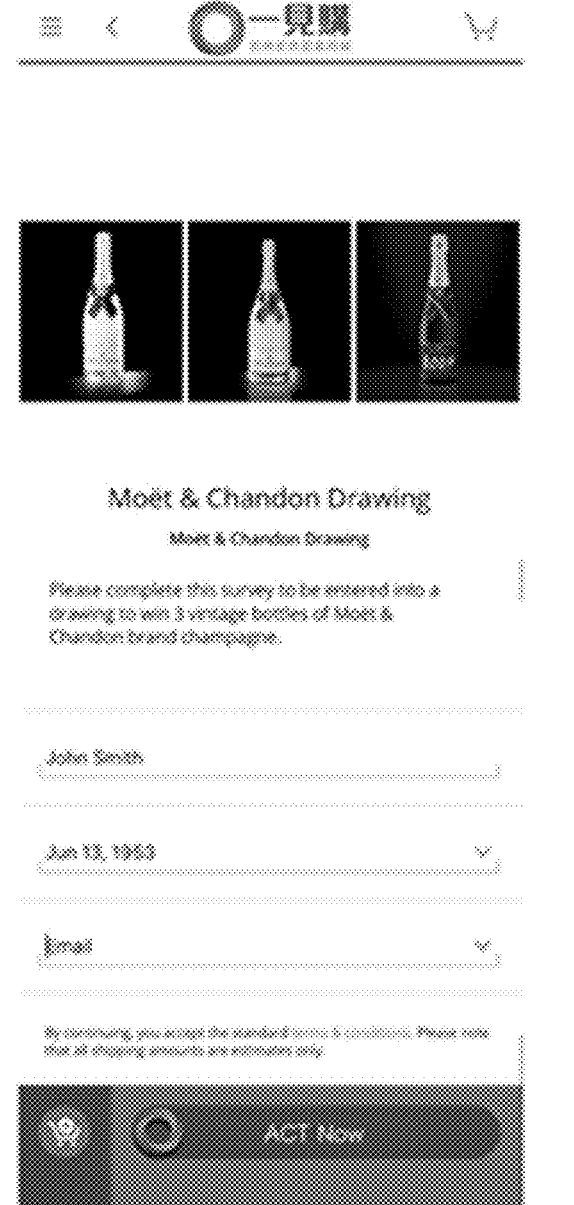
FIGS. 42 and 43 depicts screenshots of an example user interface for an application on a client device for requesting actions.
Figure 43:
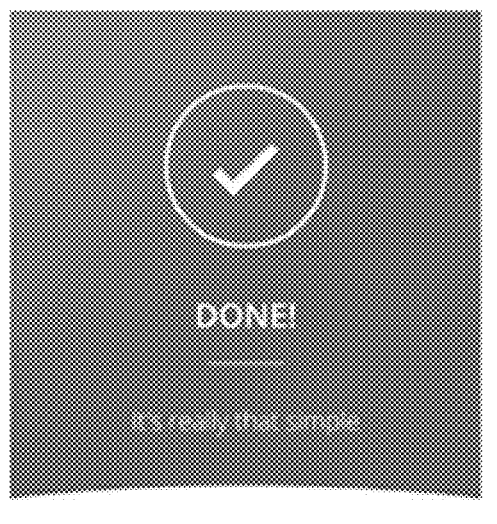
Figure 43:
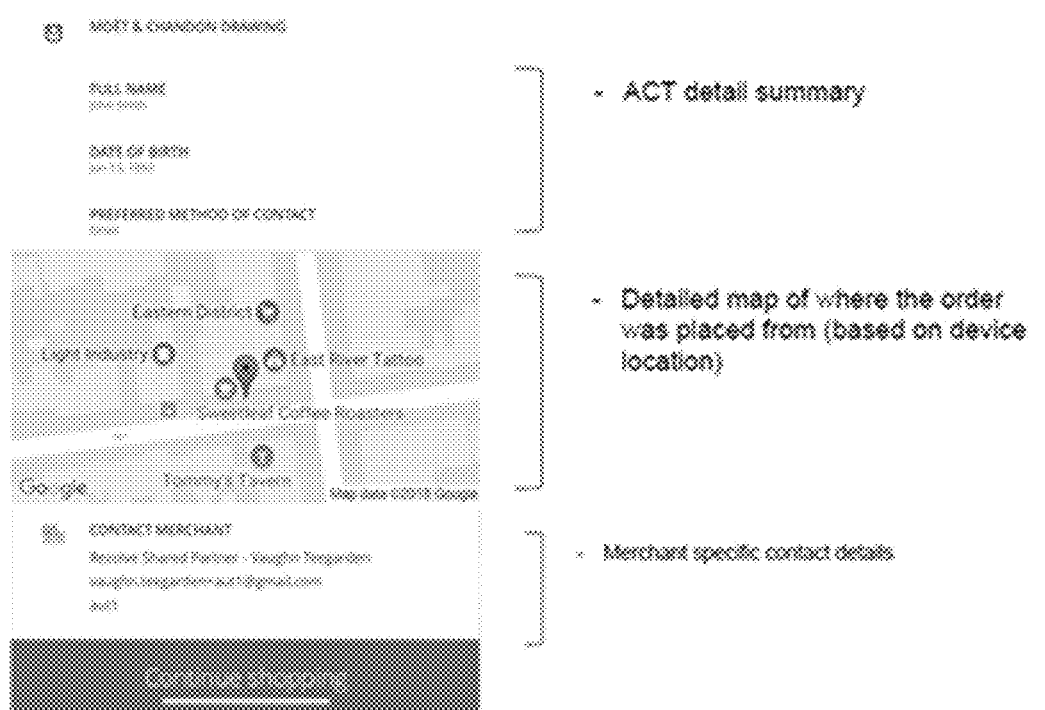

FIGS. 41-43 depicts screenshots of an example user interface for an application on a client device for requesting actions (also referred herein as a notification process). The notification process is presented when a trigger is scanned for a notification offering type, where the intended outcome is for the end user to submit information. First, in FIG. 41, the end user can scan a trigger linked to a notification offering. Second, the request handler server 110 returns to the mobile application notification data, which can include a title, short description, long description, a notification image, and any fields that the item provider service configured, among others. In FIG. 42, the mobile application can detect the notification offering type, format the data appropriately, and display a form. In FIG. 43, when the end user fills out the form and submits the form, the resulting receipt can provide confirmation that the submission was successful, a summary of the submitted information, and details on the Item provider service, among others. The item provider service can review the submitted information in the RHS.

FIG. 44 depicts screenshots of an example user interface for an application on a client device for background listening. Background listening may be a special mode of the end user application that uses the phone microphone on the client to listen for watermarked audio triggers. As triggers are detected, the offerings may be resolved and collected in a list. When the background listening session is terminated by the end user, the list of offerings is displayed, and the end user pick from the list to send a notification to the end user. First, the end user can press a button or link within the application and the background listening service is activated in the SDK. A message may be placed in the notification area to remind the end user that the service is active. Second, the application can begin listening for audio triggers using the microphone. Third, the watermarked audio may be playing out loud. Algorithm can detect any specially encoded audio in the mic's media stream. Fourth, when encoded audio trigger is detected, the audio waveform may be decoded, and the offering result may be extracted in the form of a URL. The background listening service can fire an event with the URL for the application to catch. The application can add the URL to a result list. This process may repeat until several links are in the list. Fifth, the end user can exit background listening. The end user may be returned to the Application. Sixth, the application can display a results list of offerings as touchable links as depicted in FIG. 44. The list can persist until a new listening session is started. Seventh, the end user can press on an offering link. The offering type may be a Product, Category of Products, notification (contact info form), or other result, among others. Eighth, the SDK can use the result URL to pull the requested offering, and displays the request to the end user. At this point, depending on the offering type, the end user can enter into one of the other end user flows.

FIG. 45 depicts a block diagram of an example computer system 4500. The computer system or computing device 4500 can include or be used to implement the data processing system 110 and its components, the client. The computing system 4500 includes at least one bus 4505 or other communication component for communicating information and at least one processor 4510 or processing circuit coupled to the bus 4505 for processing information. The computing system 4500 can also include one or more processors 4510 or processing circuits coupled to the bus for processing information. The computing system 4500 also includes at least one main memory 4515, such as a random access memory (RAM) or other dynamic storage device, coupled to the bus 4505 for storing information, and instructions to be executed by the processor 4510. The computing system 4500 may further include at least one read only memory (ROM) 4520 or other static storage device coupled to the bus 4505 for storing static information and instructions for the processor 4510. A storage device 4525, such as a solid state device, magnetic disk or optical disk, can be coupled to the bus 4505 to persistently store information and instructions. The storage device 4525 can include or be part of the database of the data processing system 105.

The computing system 4500 may be coupled via the bus 4505 to a display 4535, such as a liquid crystal display, or active matrix display, for displaying information to a user. An input device 4530, such as a keyboard or voice interface may be coupled to the bus 4505 for communicating information and commands to the processor 4510. The input device 4530 can include a touch screen display 4535. The input device 4530 can also include a cursor control, such as a mouse, a trackball, or cursor direction keys, for communicating direction information and command selections to the processor 4510 and for controlling cursor movement on the display 4535.

The processes, systems and methods described herein can be implemented by the computing system 4500 in response to the processor 4510 executing an arrangement of instructions contained in main memory 4515. Such instructions can be read into main memory 4515 from another computer-readable medium, such as the storage device 4525. Execution of the arrangement of instructions contained in main memory 4515 causes the computing system 4500 to perform the illustrative processes described herein. One or more processors in a multi-processing arrangement may also be employed to execute the instructions contained in main memory 4515. Hard-wired circuitry can be used in place of or in combination with software instructions together with the systems and methods described herein. Systems and methods described herein are not limited to any specific combination of hardware circuitry and software.

Although an example computing system has been described in FIG. 45, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., various modules of the system 100, such as the data processing system 105, client 120, and item provider service 125 as described in FIGS. 1-4) and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "data processing system" "computing device" "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A system, comprising:
an application executable on a computing device having one or more processors to:
transmit, via a first application programming interface (API), a first request to initiate a transaction to a first service, the first request including at least a portion of image data;
cause, responsive to receipt of the first request, the first service to communicate, via a second API, with a second service to identify an item associated with an item provider, the first service to aggregate requests to be communicated with the second service via the second API;
obtain an indication that identifies the item;
present, responsive to the indication, a user interface that includes an element to select the item;
transmit, via the first API to the first service, responsive to an interaction with the element via the user interface, a second request to proceed with the transaction on the item identified by the second service, the second request identifying the interaction;
cause, responsive to receipt of the second request, the first service to communicate, via the second API, with the second service to generate a result based on the interaction of the second request; and
receive the result for presentation.

2. The system of claim 1, comprising the application to: determine that image data matches a trigger condition to initiate the transaction defined by the item provider.

3. The system of claim 1, wherein the item is associated with the image data.

4. The system of claim 1, comprising the application to: provide the result for presentation on the user interface of the computing device.

5. The system of claim 1, comprising the application to: acquire the image data via a sensor communicatively coupled with the computing device.

6. The system of claim 1, comprising the application to: receive, from the first service via the first API, a link corresponding to a trigger condition to initiate the transaction defined by the item provider, the trigger condition defined by the item provider to specify the item.

7. The system of claim 1, comprising the application to: detect the interaction with the element via the user interface.

8. The system of claim 1, comprising the application to: compare the image data with retrieved data to initiate the transaction.

9. The system of claim 1, comprising the application to: identify, based on a match between the image data and a trigger condition, an item identifier corresponding to the trigger condition, the item identifier referencing the item.

10. The system of claim 1, comprising the application to: insert an item identifier into the first request to initiate the transaction to the first service.

11. The system of claim 1, comprising the application to: receive, from the first service via the first API, offering data associated with the item associated with the item provider.

12. The system of claim 1, comprising the application to: monitor for data via a sensor coupled with the computing device, the sensor including at least one of a camera, a microphone, a global position system (GPS) device, a near field communication (NFC) unit, or a network communication interface.

13. The system of claim 1, comprising:
the application to execute on the computing device as at least one of an add-on to a second application on the computing device or a standalone application on the computing device.

14. A system, comprising one or more processors to:
receive, from a computing device via a first application programming interface (API), a first request to initiate a transaction, the first request including at least a portion of image data that matches a trigger condition to initiate transactions defined by an item provider;
communicate, via a second API, with a service to identify, based on the portion of the image data, an item associated with the item provider;
aggregate requests to be communicated with the service via the second API;
transmit, to the computing device via the first API, an identification of the item;
receive, from the computing device via the first API, responsive to an interaction with an element of a user interface, a second request to proceed with the transaction on the item, the second request identifying the interaction;
communicate, with the service via the second API, the second request to proceed to generate a result that indicates an outcome of the transaction based on the interaction; and
transmit, to the computing device, the result to cause the computing device to present the result on the user interface.

15. The system of claim 14, comprising the one or more processors to:

cause the computing device to present the user interface, the user interface including the element to select the item.

16. The system of claim 14, comprising the one or more processors to:

transmit, to the computing device via the first API, a link corresponding to the trigger condition to initiate the transaction; and provide, to the computing device via the link of the plurality of links, access to data for the trigger condition to initiate the transaction.

17. The system of claim 14, comprising the one or more processors to:

communicate with the service via the second API to identify, based on the portion of the image data, offering data corresponding to the item.

18. The system of claim 14, comprising:

a sensor to acquire the portion of the image data, the sensor communicatively coupled with the computing device, the sensor including at least one of a camera, a microphone, a global position system (GPS) device, a near field communication (NFC) unit, or a network communication interface.

19. A method, comprising:

acquiring, by an application executing on a computing device having one or more processors, image data via a sensor communicatively coupled with the computing device;

transmitting, by the application via a first application programming interface (API), a first request to initiate a transaction to a first service based on a match with a trigger condition, the first request including at least a portion of the image data acquired via the sensor;

causing, responsive to receipt of the first request, the first service to communicate, via a second API, with a second service to identify an item corresponding to the portion of the image data to provide to the computing device, the first service to aggregate requests to be communicated with the second service via the second API;

presenting, by the application, responsive to identification of the item, a user interface including an element to select the item;

transmitting, by the application, responsive to an interaction with the element, via the first API to the first service, a second request to proceed with the transaction, the second request identifying the interaction, receipt of the second request causing the first service to communicate, via the second API, with the second service to generate a result based on the interaction of the second request; and receiving, by the application, the result from the first service for presentation on the user interface.

20. The method of claim 19, comprising:

receiving, by the application via the first API, an indication identifying the item associated with one of an item provider from the first service.

\* \* \* \* \*